US011736750B2

United States Patent
Schenker et al.

(10) Patent No.: US 11,736,750 B2
(45) Date of Patent: Aug. 22, 2023

(54) METHODS AND APPARATUS TO GENERATE REFERENCE SIGNATURES FROM STREAMING MEDIA

(71) Applicant: The Nielsen Company (US), LLC, New York, NY (US)

(72) Inventors: Adam Schenker, Tampa, FL (US); Nigel Smith, Richardson, TX (US); Shailendra Paranjape, Tampa, FL (US); Vinay Chauhan, Sunnyvale, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/565,787

(22) Filed: Dec. 30, 2021

(65) Prior Publication Data

US 2022/0124395 A1 Apr. 21, 2022

Related U.S. Application Data

(63) Continuation of application No. 15/679,862, filed on Aug. 17, 2017, now Pat. No. 11,234,029.

(51) Int. Cl.
*H04N 21/24* (2011.01)
*H04N 21/439* (2011.01)
(Continued)

(52) U.S. Cl.
CPC ..... *H04N 21/2402* (2013.01); *H04N 21/2401* (2013.01); *H04N 21/26603* (2013.01);
(Continued)

(58) Field of Classification Search
CPC ......... H04N 21/2402; H04N 21/44224; H04N 21/2401; H04N 21/26603; H04N 21/439;
(Continued)

(56) References Cited

U.S. PATENT DOCUMENTS 8,489,884 B2  7/2013  Srinivasan
9,136,965 B2  9/2015  Topchy et al.
(Continued)

OTHER PUBLICATIONS

W3schools, "HTML <meta> Tag," Retrieved from the Internet: [https://www.w3schools.com/tags/tab_meta.asap], Retrieved on Apr. 13, 2017, 5 pages.
(Continued)

*Primary Examiner* — Sumaiya A Chowdhury

(57) ABSTRACT

Example apparatus disclosed herein are to receive a log file, compare a first media monitor identification associated with an audio signature, a second media monitor identification associated with media metadata, and a third media monitor identification associated with event metadata. Disclosed example apparatus are also to determine if a first timestamp associated with the audio signature is within a time period, wherein the time period begins with a second timestamp associated with the media metadata and ends with a third timestamp associated with the event metadata. Disclosed example apparatus are also to validate that the audio signature satisfies a threshold for being stored as a reference signature based on at least one of the media metadata, the event metadata, the first timestamp, the second timestamp, or the third timestamp. Disclosed example apparatus are also to generate the reference signature including assigning the media metadata to the audio signature.

18 Claims, 10 Drawing Sheets

(51) Int. Cl.
    *H04N 21/266*     (2011.01)
    *H04N 21/658*     (2011.01)
    *H04N 21/442*     (2011.01)
    *H04N 21/8547*     (2011.01)

(52) U.S. Cl.
    CPC ..... *H04N 21/439* (2013.01); *H04N 21/44222* (2013.01); *H04N 21/44224* (2020.08); *H04N 21/6582* (2013.01); *H04N 21/8547* (2013.01)

(58) Field of Classification Search
    CPC ......... H04N 21/44222; H04N 21/6582; H04N 21/8547
    See application file for complete search history.

(56) References Cited

U.S. PATENT DOCUMENTS

| | | |
|---|---|---|
| 9,514,503 B2 | 12/2016 | Ramaswamy et al. |
| 9,520,142 B2 | 12/2016 | Kalampoukas et al. |
| 9,548,830 B2 | 1/2017 | Kariyappa et al. |
| 11,234,029 B2 | 1/2022 | Schenker et al. |
| 2003/0191989 A1 | 10/2003 | O'Sullivan |
| 2007/0136782 A1 | 6/2007 | Ramaswamy et al. |
| 2008/0263579 A1* | 10/2008 | Mears ................ H04N 21/6125 |
| 2010/0010890 A1 | 1/2010 | Ditkovski et al. |
| 2010/0287196 A1 | 11/2010 | Shields et al. |
| 2012/0209949 A1 | 8/2012 | Deliyannis et al. |
| 2013/0311478 A1 | 11/2013 | Frett et al. |
| 2013/0312019 A1 | 11/2013 | McMillan |
| 2014/0282640 A1* | 9/2014 | Nielsen ............ H04N 21/25866 725/9 |
| 2015/0319490 A1 | 11/2015 | Besehanic |
| 2015/0332669 A1 | 11/2015 | Kalampoukas et al. |
| 2016/0094601 A1* | 3/2016 | Besehanic ............... H04L 67/60 709/219 |
| 2019/0058907 A1 | 2/2019 | Schenker et al. |

OTHER PUBLICATIONS

Laforge, Anthony, "Saying goodbye to Flash in Chrome," Retrieved from the Internet: https://www.blog.google/products/chrome/saying-goodbe-flash-chrome/, Jul. 25, 2017, 3 pages.

Smedberg, Benjamin, "NPAPI Plugins in Firefox," Retrieved from the Internet: https://blog.mozilla.org/futurereleases2015/10/08/npapi-plugins-in-firefox/, Future Releases, Oct. 8, 2015, 5 pages.

United States Patent and Trademark Office, "Non-Final Office Action," issued in connection with U.S. Appl. No. 15/679,862, dated Apr. 5, 2019, 16 pages.

United States Patent and Trademark Office, "Final Office Action," issued in connection with U.S. Appl. No. 15/679,862, dated Nov. 13, 2019, 14 pages.

United States Patent and Trademark Office, "Advisory Action," issued in connection with U.S. Appl. No. 15/679,862, dated Feb. 4, 2020, 2 pages.

United States Patent and Trademark Office, "Non-Final Office Action," issued in connection with U.S. Appl. No. 15/679,862, dated Mar. 5, 2020, 20 pages.

United States Patent and Trademark Office, "Final Office Action," issued in connection with U.S. Appl. No. 15/679,862, dated Sep. 22, 2020, 20 pages.

United States Patent and Trademark Office, "Notice of Allowance and Fee(s) Due," issued in connection with U.S. Appl. No. 15/679,862, dated Sep. 10, 2021, 14 pages.

United States Patent and Trademark Office, "Corrected Notice of Allowability," issued in connection with U.S. Appl. No. 15/679,862, dated Sep. 21, 2021, 7 pages.

* cited by examiner

METHODS AND APPARATUS TO GENERATE REFERENCE SIGNATURES FROM STREAMING MEDIA

RELATED APPLICATION

This patent arises from a continuation of U.S. patent application Ser. No. 15/679,862, (now U.S. Pat. No. 11,234,029) which was filed on Aug. 17, 2017. U.S. patent application Ser. No. 15/679,862 is hereby incorporated herein by reference in its entirety. Priority to U.S. patent application Ser. No. 15/679,862 is hereby claimed.

FIELD OF THE DISCLOSURE

This disclosure relates generally to media monitoring, and, more particularly to methods and apparatus to generate reference signatures from streaming media.

BACKGROUND

Internet access to media has become widespread. Media is now frequently streamed to consumers via streaming services such as, Hulu®, HBO GO®, and others. Streaming enables media to be delivered to and presented by a wide variety of media devices, such as laptop computers, desktop computers, personal tablets, smart TVs, Apple TVs®, Roku® media players, Boxee™ media players, Sony PlayStations®, Microsoft® Xboxes®, Apple iPads®, etc.

DETAILED DESCRIPTION

Figure 1:
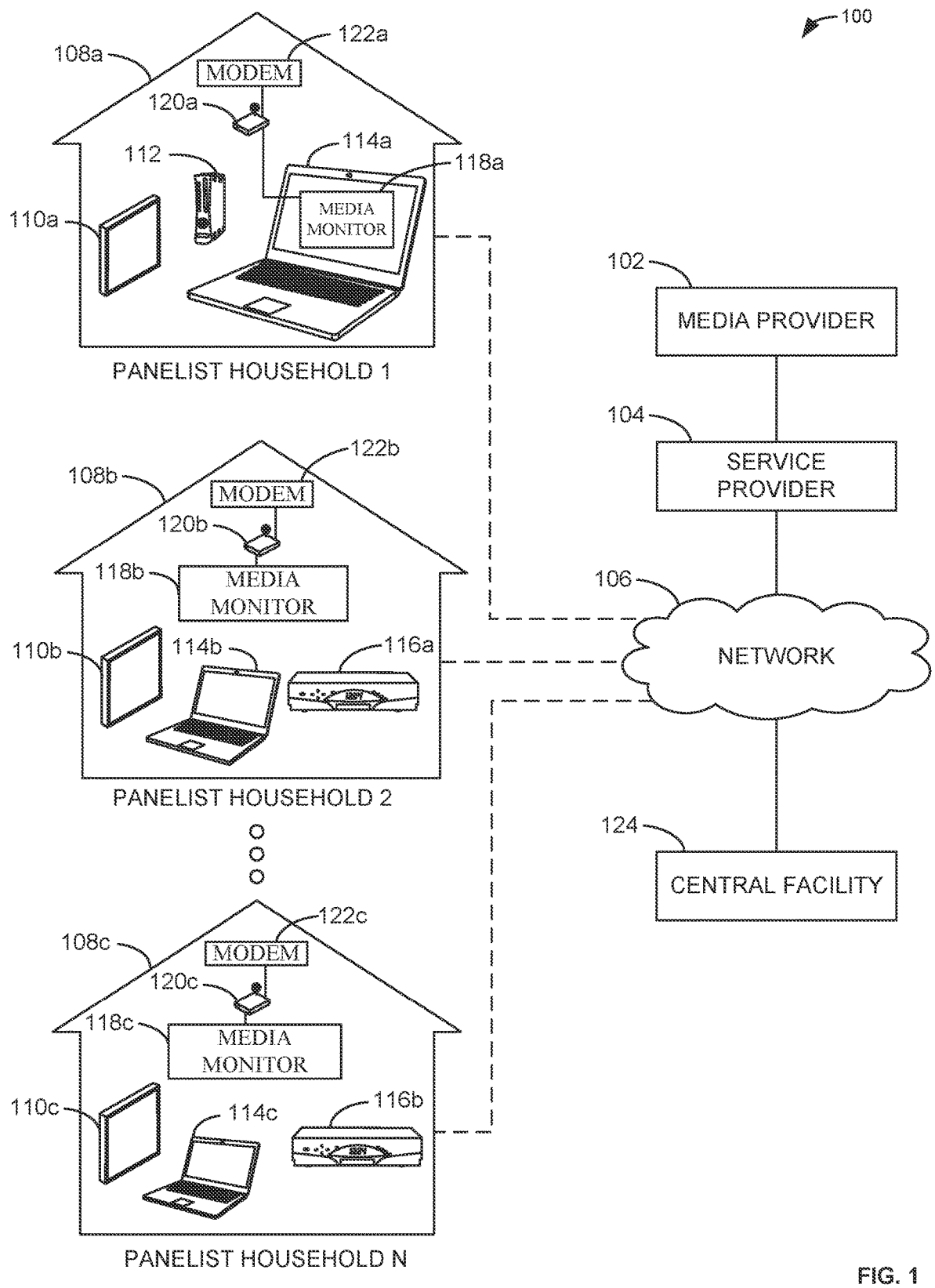
FIG. 1 is a schematic illustration of a data collection system in which information from panelist household(s) is provided to a central facility.

The use of media devices (e.g., laptop computer, desktop computer, personal tablet, smart TVs, Apple TVs®, Roku® media players, Boxee™ media players, Sony PlayStations®, Microsoft® Xboxes®, Apple iPads®, etc.) to present streaming media available via the Internet has increased in recent years. As used herein "media" refers to audio and/or visual (still or moving) media and/or advertisements. Streaming media refers to media that is presented to a user by a media device at least partially in parallel with the media being transmitted (e.g., via a network) to the media device (or a device associated with the media device) from a media provider.

In view of the increasing popularity of accessing media in this manner, understanding how users interact with the streaming media (e.g., such as by understanding what media is presented, how the media is presented, who is accessing such media, etc.) provides valuable information to service providers, advertisers, content providers, media providers, manufacturers, and/or other entities.

Conventionally, an entity interested in information regarding how users interact with media could obtain such information in several ways. For example, an entity could conduct a survey in which participants self-report their consumption and engagement behavior with various forms of media. This survey data could be collected on a regular basis or on a per-inquiry basis for a specific purpose. Audience measurement entities perform this work on behalf of clients to provide value through determining the reach of media.

Traditionally, audience measurement entities (also referred to herein as "ratings entities") determine demographic reach for advertising and media programming based on registered panel members. That is, an audience measurement entity enrolls people who consent to being monitored into a panel. During enrollment, the audience measurement entity receives demographic information from the prospective panelists so that subsequent correlations may be made between advertisement/media exposure to those panelists and different demographic markets.

People become panelists via, for example, a user interface presented on a media device (e.g., via a website). People become panelists in additional or alternative manners such as, for example, via a telephone interview, by completing an online survey, etc. Additionally or alternatively, people may be contacted and/or enlisted into panels using any desired methodology (e.g., random selection, statistical selection, phone solicitations, Internet advertisements, surveys, advertisements in shopping malls, product packaging, etc.).

Once registered, panelists are monitored using one or more of a variety of forms of media monitoring that collect and report information (e.g., content of media, how the media is presented, who is accessing the media, duration of consumption, etc.) on a participant's media exposure and/or consumption. In some examples, media monitoring devices work primarily in the background of the media presentation experience, collecting data without directly interfering with the participant's experience or raising awareness of the presence of the monitoring devices.

In some examples, a media monitoring device may be implemented by software, firmware, and/or a combination of hardware, software and firmware. In some examples of media monitoring devices, audio is collected for use in recognizing the presented media. This audio is collected via hardware means (e.g., a microphone) or in other examples may be collected using software means (e.g., collection of operating-system level audio).

One technique to acquire useful data from audio is to compare the captured audio recording to a database of reference (e.g., known) audio. One technique to facilitate such a comparison is through the comparison of both the captured audio and the reference audio. Signature-based media monitoring techniques generally use one or more inherent characteristics of the monitored media during a monitoring time interval to generate a substantially unique, but repeatable, proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A good signature is one that is repeatable when processing the same media presentation at different locations or using different hardware/software to perform the signaturing process, but that is unique relative to other (e.g., different) presentations of other (e.g., different) media. The terms "fingerprint" and "signature" are used interchangeably herein and are hereby defined herein to mean "a proxy that may be used for identifying media by comparison with a reference database and that is generated from one or more inherent characteristics of the media."

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. As used herein, these signatures representative of media signal(s) will be referred to as "audio signatures." Further, audio signatures includes both query signatures, which represent media presented at the household that has yet to be identified, and reference signatures, which are identified as corresponding to known media. As used herein, the term "reference signature" refers to a signature used as a basis for measuring media. For example, a signature generated from a household media monitor apparatus may be compared to a reference signature to identify presented media. As used herein, the term "reference signature candidate" refers to a signature that can be selected to be stored in a database for use as a basis in measuring media. Various comparison criteria, such as a cross-correlation value, a Hamming distance, etc., can be evaluated to determine whether a monitored signature matches a particular reference signature.

When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature.

For signature-based media monitoring techniques to be utilized, reference signatures must be generated for relevant media (e.g., television shows, movies, YouTube® videos, etc.). For example, a media provider (e.g., movie studio, television studio, online content producer, etc.) may send reference media to an audience measurement entity (e.g. The Nielsen Company (US) LLC) so that the media may be processed to create reference signatures. With the increasing pace of new media releases on numerous streaming platforms (e.g., Hulu®, YouTube®), audience measurement entities can be delayed in measuring the audience reception to new media due to the lack of reference signatures.

As an alternative to waiting to receive reference media from media providers, reference signatures may be generated by monitoring known media outputs (e.g., television programming, Hulu® shows, etc.) and assigning signatures of the known media information (e.g., title, season, language, etc.) to be reference signature(s). However, this may be a slow process and requires coordination at the audience measurement entity. While there are other methodologies for media identification, such as embedded codes and/or watermarks, some entities do not utilize these technologies for identification.

In addition to audio signatures, some examples of media monitors may collect metadata. As used herein, "metadata" refers to data that describes other data. For example, a web page can contain metadata providing information on the name of the website, the description of the website, the author of the website, the character style that will be utilized for the type on the website, and numerous other attributes. Metadata that may provide attributing characteristics to media is associated with the specific application from which the metadata is extracted. For instance, metadata that is extracted from a web page can be formatted differently and contain different information than metadata extracted from a smartphone application. The metadata may not be inherently present in the media, but rather is provided via the application presenting the media.

On websites that display media, for example, media metadata may be available describing the media (e.g., title, creator, episode, season, etc.). Hence, for audience measurement entities, media metadata that is extracted by a media monitor may be useful for attributing certain media consumption to a panelist's demographic. In addition to media metadata, event metadata may be available providing information on the media events that occur on a webpage (e.g., play, pause, seek, end, unload, abort, etc.). In some examples, however, metadata collection may be difficult. For example, the formatting of metadata may vary depending on the specific media presentation device a panelist utilizes. In other examples, metadata may not be available at all due to lack of support for metadata from the device. In yet other examples, metadata may be present in a recognizable format but may be incomplete due to a lack of information provided by the media provider, or other factors. In such examples, it may be difficult for the audience measurement entity to accurately attribute media to a demographic on the basis of metadata alone.

In example methods, apparatus, systems and articles of manufacture disclosed herein, reference audio signatures can be created for media based on the collection of media metadata and the collection of audio signatures during the playing of the media. For example, when a participant who has a media monitor views media online, the media metadata and audio signature(s) can be collected.

In some examples, the media metadata and the audio signature(s) are associated and forwarded to a central processing facility, which will perform various validation steps before aspects of the metadata are combined with the audio signature(s) to create reference signature(s). In some examples, validation steps may be carried out at the media monitor to determine if the audio signature being generated meets various thresholds to be a reference signature candidate.

In examples disclosed herein, metadata is collected by the media monitor from a media presentation device (e.g., computer) on which the media monitor is installed. Alternatively, the media monitor may be a separate device from the media presentation device. In some examples, the media metadata that is extracted specifically describes media data, such as content title, episode, season, language, and other features of the media. In some examples, accompanying this media metadata is event metadata, which provides information on various playback events that may occur during the media presentation (e.g., start, pause, seek, stop, etc.). In some examples, the media metadata that is extracted is useful in attributing a media description to a generated audio signature. In such examples, the audio signature is generated substantially simultaneously to the collection of the metadata. Alternatively, the audio signatures may be generated at a different time from when the metadata is collected. For example, audio may be stored and the signatures may be made "offline." In various examples, different descriptive information may be required to be extracted from the metadata in order to sufficiently identify the media. For example, the identification information required for a show on an open community media platform (e.g., YouTube®) may be different than a curated media platform (e.g., Hulu®).

The event-based data (e.g., event metadata) is useful in determining whether the user engaged in a media presentation experience that would provide an audio signature representative of the media. For example, a panelist may watch a television show in a window on his or her computer while simultaneously performing another task involving audio, such as having an audio discussion on a networking platform (e.g., Skype®). In such examples, the audio collected by the media monitor will not be representative of the audio of the television show, and hence the captured audio is a poor candidate to serve as a reference signature.

In some examples, after validation and processing steps and upon the association of the relevant metadata with the audio signature file and the creation of a reference audio signature, the reference signature may be stored in a database for future use in identifying query signatures. In other examples, the reference audio signature may undergo additional processing to be utilized along with similar references describing the same media which have been collected from other participants. In some examples, the reference signature, once finalized, may be utilized to identify media on platforms from which metadata cannot be extracted or the media cannot be sufficiently identified based on the metadata.

In some examples, the reference audio signatures can be generated from users without any user input. In such examples, the media monitor(s) continually (or substantially continually) monitors and collects the metadata and the audio signatures from the device and generates reference signatures without the user's awareness. In some examples, participants utilizing the media monitor(s) already upload data for standard media consumption analysis purposes, and hence the additional creation of reference signatures has no notable impact on the operations on the participant user experience, while allowing the audience measurement entity to collect reference audio signatures autonomously and on media that may be newly uploaded to the media provider.

FIG. 1 is a schematic illustration of an example system constructed in accordance with the teachings of this disclosure for generating reference signatures from panelists based upon an association of metadata and audio signatures. The example system 100 of FIG. 1 includes a media provider 102 connected to a service provider 104. In the example, the service provider 104 connects to a network 106. The example system further includes panelist households 108a, 108b and 108c, which are connected to the network 106.

The first household 108a, for example, includes a television 110a, a gaming console 112, and a computing device 114a. The second household 108b contains a television 110b, a computing device 114b, and a set-top box 116a. The third household 108c contains a television 110c, a computing device 114c and a set top box 116b.

The first household 108a includes a media monitor 118a on the computing device 114a. The second and third households 108b and 108c each have a standalone media monitor 118b and 118c. The first, second and third households 108a, 108b and 108c further include a network gateway 120a, 120b and 120c. In this example, in each of the first, second and third households 108a, 108b and 108c the network gateways 120a, 120b and 120c each connect to a modem 122a, 122b and 122c. Each of the modems 122a, 122b and 122c connects to the network 106. In this example, the network 106 has an additional connection to a central facility 124 of the audience measurement entity.

While a single example media provider 102 corresponds to any of one or more media provider(s) (e.g., YouTube®, Hulu®, Amazon Video®, etc.) capable of providing media for presentation via the media devices 110a-c, 112, 114a-c, 116a-b. The media distributed by the media provider 102 can, for example, correspond to live media, broadcast media, stored media, on-demand content, or other forms of media. In some examples, the media contains metadata indicative of the contents of the media (e.g., title, producer, episode, season, language, etc.). In some examples, the media may contain watermarks for use in identification of the media by the audience measurement entity.

The service provider(s) 104 of the illustrated example of FIG. 1 provide media services to the media devices 110a-c, 112, 114a-c, 116a-b via, for example, webpages including links (e.g., hyperlinks, embedded media, etc.) to media provided by the media provider 102. Example service provider(s) 104 include, but are not limited to, cable Internet providers, digital subscriber line (DSL) Internet providers, satellite Internet providers, and/or telecommunications providers. In some examples, the media provider 102 and the service provider 104 are the same entity. In other examples, the service provider 104 modifies the media provided by the media provider 102 prior to transmitting the media to the media devices 110a-c, 112, 114a-c, and 116a-b. In such examples, the service provider 104 may add, append, edit, modify, or remove metadata or an audio watermark, fingerprint, or signature. In other examples, the media may be transmitted from the media provider 102 and through the service provider 104 with limited or no modifications. In some examples, the service provider 104 prepares media for presentation regardless of whether (e.g., prior to) a request is received from the media device 110a-c, 112, 114a-c, and 116a-b. In such examples, the already-prepared media is stored in a data store of the service provider 104 (e.g., such as in a flash memory, magnetic media, optical media, etc.). In other examples, the service provider 104 prepares the media for streaming in response to a request received from the media device 110a-c, 112, 114a-c, and 116a-b. Alternatively, the media can be presented on the device by downloading the media to the media device, by accessing the media from an internal or external storage device, or using other known methods.

The network 106 of the illustrated example of FIG. 1 is the Internet. Additionally or alternatively, any other network communicatively linking the service provider 104, the media devices 110a-c, 112, 114a-c, 116a-b and the central facility 124 may be used. In other examples, the network 106 is a combination of other, smaller networks, all of which can be either public or private. Elements are referred to as communicatively linked if they are in direct or indirect communication through one or more intermediary components and do not require direct physical (e.g., wired) communication and/or constant communication, but rather include selective communication at periodic or aperiodic intervals, as well as one-time events.

The example panelist households 108a, 108b, and 108c of FIG. 1 are each registered with an audience measurement entity (e.g., The Nielsen Company (US) LLC). The example panelist households 108a, 108b, and 108c are each capable of contributing data to the audience measurement entity. While, the example system of FIG. 1 depicts three panelist households 108a, 108b and 108c, but any number can be used.

In the illustrated example of FIG. 1, the panelist households 108a, 108b, and 108c contain numerous media devices 110a-c, 112, 114a-c, 116a-b. The first panelist household 108a contains a television 110a, a gaming console 112, and a computing device 114a. In this example, each of the devices has the capability of displaying media, but may operate differently and communicate information differently. Some of the devices may additionally receive and/or store and/or transmit metadata regarding the media that is presented on the device, while other devices may not be capable or may not be enabled to do so. In one example, the television 110a may be connected to another device to receive cable programming. The television 110a may additionally, or alternatively, be connected to the Internet to stream media. In this example, the Internet may be accessed using various apps on a smart TV. Additionally, in the example system of FIG. 1, the computing device 114a can access the Internet via a web browser to view media. In this example, the web browser can receive metadata on the media that is presented in the browser. In other examples, the computing device 114a may present media via a separate application (e.g., iTunes). The example first panelist household 108a additionally contains a gaming console 112, which is capable of displaying disk-based media (e.g., digital versatile disks (DVD's)) or streaming media via the Internet.

The example second panelist household 108b contains a television 110b and a computing device 114b which are functionally similar, but may be alternatively configured or utilized, as the previously described television 110a and computing device 114a. In the example system of FIG. 1, the second panelist household 108b additionally contains a set top box 116a which is capable of receiving programming from a television service provider. In some examples, the programming received may contain watermarks, signatures or fingerprinting to aide in the identification of the media presented for the audience measurement entity.

In the example system of FIG. 1, the third panelist household 108c contains a television 110c, a computing device 114b, and a set top box 116b, which is functionally similar, but may be alternatively configured or utilized, as the previously described televisions 110a and 110b, computing device 114b, and set top box 116b.

In the illustrated example of FIG. 1, each of the panelist households 110a-c contains a media monitor 118a-c that is capable of capturing data pertaining to the media presented in the panelist's household. In the first panelist household 108a, the media monitor 118a is implemented through software on the computing device 114a. In this example, the media monitor 118a is capable of collecting audio within the computing device 114a (e.g., via an interface of an operating system of the computing device 114a). In this example, the media monitor 118a may collect audio directly from the device's operating system and process it using a software library. Additionally, other information such as metadata may be extracted via a software implementation utilizing a browser extension in the same browser within which the panelist's media presentations occur. The media monitor 118a is also capable of generating audio signatures from the collected audio. Additionally, in this example, the media monitor 118a is able to collect metadata from the web browser of the computing device 114a.

For examples in which the media monitor 118a is software based or has software components, the media monitor 118a may be implemented as a standalone application using the application program interfaces (APIs), libraries and frameworks of the native platform. In other examples, the media monitor 118a can be implemented in a browser environment using supported standards (e.g., Hypertext Markup Language, Version 5 (HTML5), JavaScript, etc.). Alternatively or additionally, the media monitor 118a can be implemented using a third party software component in conjunction with a web browser (e.g., a web browser extension or plug-in, Flash, Silverlight, etc.). In further examples, the media monitor 118a can be implemented using any combination of supported standards, third party software, the native platform's API's, libraries and frameworks, and any other capable software package.

The association of the collected metadata and the generated audio signatures enables the creation of reference signatures, which may occur at either the media monitor 118a, 118b or 118c or the central facility 124. The enablement of individual panelist households 108a, 108b or 108c to contribute data allows for the crowdsourcing of reference signatures (e.g., numerous panelists contribute data from the panelists' viewed media to enable the audience measurement entity to creation reference signatures). While the media monitor 118a of the first household is a software implementation in the system of FIG. 1, it could be implemented through hardware, firmware, software, or a combination of any of these forms.

For example, in the second panelist household 108b and the third panelist household 108c, the media monitors 118b and 118c are implemented through a combination of hardware, software and firmware. In this example, these media monitors 118b and 118c utilize a microphone to collect audio information in areas where media is being presented. In such examples, the media monitors 118b and 118c are able to generate audio signatures that form a query to the central facility 124 to characterize the media and attribute it to the panelist households 108b and 108c. In other examples, this audio signature may be generated at the central facility 124 instead. The media monitors 118b and 118c of the example system of FIG. 1 are additionally capable of collecting metadata on the devices which receive media from the Internet. While the example system 100 of FIG. 1 shows one media monitor 118a, 118b or 118c at each of the panelist households 108a, 108b and 108c, there may be one or more media monitors 118a, 118b or 118c, using any combination of the discussed implementations or any other implementation which is capable of monitoring media presentations.

Additionally, while the panelist households 108a, 108b and 108c are shown as each having a single media monitor 118a, 118b, 118c, a household may include multiple media monitors and/or media monitors that can monitor more than one device. The media monitors located at a panelist household may be of similar or different implementations. As such, some of the media monitors in a household may be implemented using software and some may be implemented using software in combination with hardware.

In the illustrated example of FIG. 1, the network gateways 120a, 120b, and 120c of the first, second and third households enable media devices 110a-c, 112, 114a-c, and 116a-b to communicate with the network 106. In some examples, the network gateways 120a, 120b, and 120c include gateway functionality such as modem capabilities. In other examples, the example network gateway 120a, 120b and 120c is implemented in two or more devices (e.g., a router, a modem, a switch, a firewall, etc.). In further examples, the network gateway 120a, 120b, or 120c hosts a local area network (LAN) for the panelist household 108a, 108b or 108c. In the illustrated example, the LAN is a wireless local area network (WLAN) and allows the media devices 110a-c, 112, 114a-c, 116a-b to transmit and receive data via the Internet. Alternatively, the network gateways 120a, 120b and 120c may be coupled to such a LAN. In some examples, the network gateway can be integrated in the media device 110a-c, 112, 114a-c, 116a-b.

The example system of FIG. 1 further includes modems 122a, 122b and 122c for each of the first household 108a, second household 108b and third household 108c. The modems 122a, 122b and 122c enable network communications of the media to reach the panelist households 108a, 108b and 108c, and transfer of collected data to reach the central facility 124. In some examples, the modems 122a, 122b and 122c are digital subscriber line (DSL) modems, while in other examples the modems 122a, 122b and 122c are cable modems. In some examples, any of the modems 122a, 122b and 122c may be any form of media converter that converts one type of communications medium (e.g., electrical communications, optical communications, etc.) into another type of communications medium. In the illustrated example of FIG. 1, the modems 122a, 122b and 122c are separate from the network gateways 120a, 120b and 120c. However, in some examples, the modems 122a, 122b, and 122c may be part of (e.g., integral to) the respective network gateway 120a, 120b, and 120c. In some examples, the modem can be integrated in the media device 110a-c, 112, 114a-c, 116a-b.

Further, the system 100 of FIG. 1 contains a central facility 124. The central facility 124, for example, receives data from the numerous panelist households 108a, 108b, and 108c on the media presentations encountered. The central facility 124 receives both audio signatures and metadata, in addition to other data, from the panelist households 108a, 108b and 108c. The central facility 124 then performs validation and processing steps in order to create reference signatures from the received audio signatures and the associated metadata. In some examples, the processing and validation steps may occur at a single facility. In other examples, the processing and validation steps may occur at any combination of the media monitor 118a, 118b or 118c, the central facility 124, and other facilities associated with the panelist households 108a, 108b, and 108c or the audience measurement entity. In other examples, there may be multiple facilities performing the same function as the single central facility 124.

In operation, the media provider(s) 102 provides media (e.g., a television show, a movie, etc.) to the service provider(s) 104. The service provider(s) 104 modifies the media to supply an identifying characteristic, such as a watermark or transmits the media unaltered. The service provider 104 then utilizes the network 106 (e.g., the Internet) to transmit the media to a panelist household 108a, 108b or 108c location. Within a panelist household 108a, 108b or 108c, there exist one or more media devices, 110a-c, 112, 114a-c, and 116a-b any of which receive the media.

While the media is presented at the panelist household 108a, 108b or 108c location, the media monitor 118a, 118b or 118c collects audio and generates an audio signature of the media being played. Alternatively, the audio may be captured at media monitor 118a, 118b or 118c and the audio is sent to the central facility 124, where the signature can be generated.

The media monitor 118a, 118b or 118c additionally collects metadata pertaining to the description of the media and playback events. The media monitor 118a, 118b or 118c performs validation steps to ensure the audio signature and metadata meet several criteria to become a reference signature candidate. Alternatively, the validation could be performed at the central facility 124.

The network gateway 120a, 120b or 120c receives the data (the metadata and audio record and/or audio signature) from the media monitor 118a, 118b or 118c and passes it to the modem 122a, 122b or 122c, which transmits the data to the network 106. The central facility 124 then receives the metadata and the audio signature(s). The metadata and audio signature(s) are then put through a validation process in which the appropriate audio signatures are matched to the metadata based on a household and user identification and timestamps. The central facility 124 then associates descriptive media information from the metadata with the audio signature to create a reference signature.

Figure 2A:
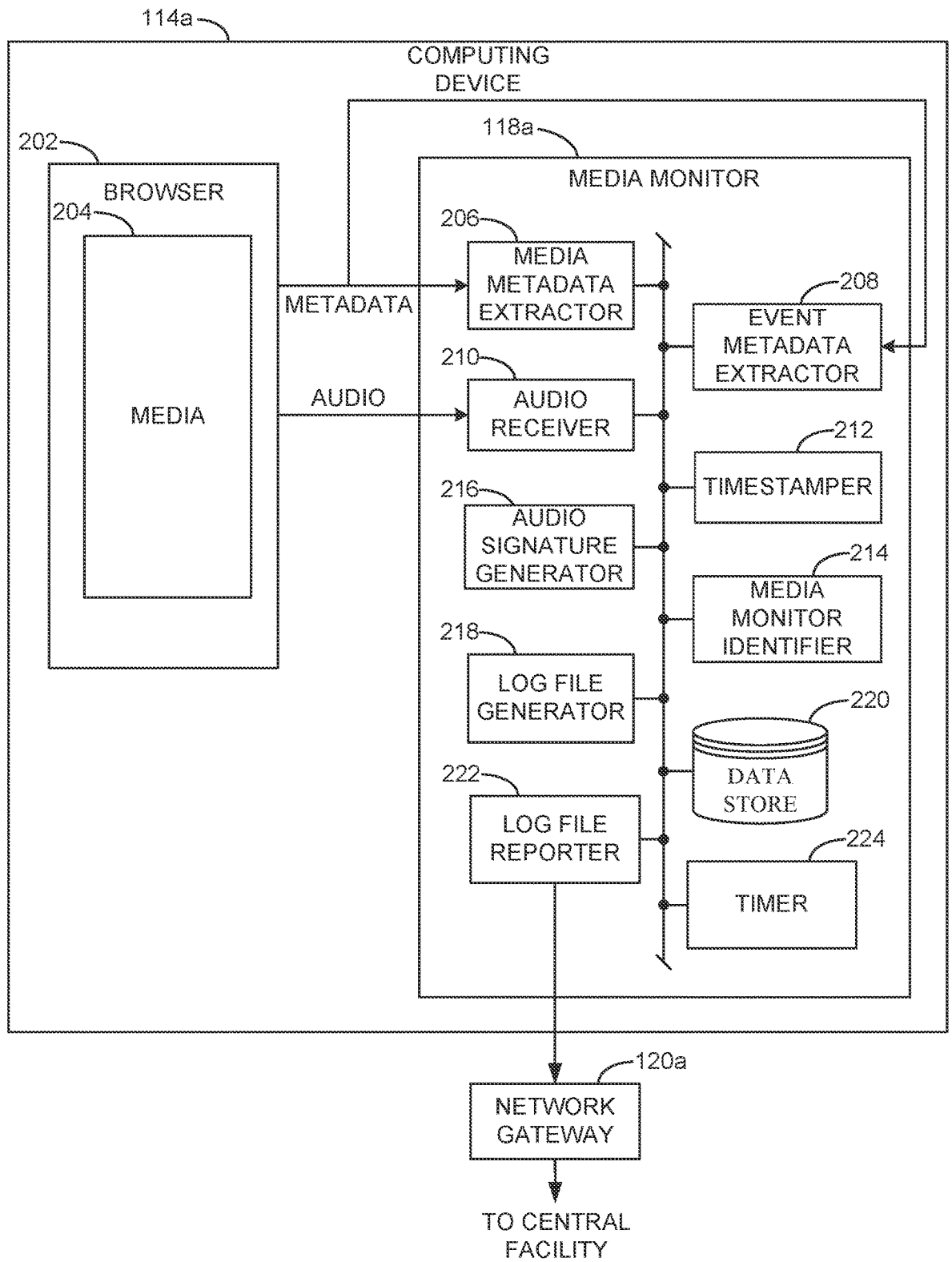
FIG. 2A is a block diagram showing additional detail of the example computing device and associated media monitor of FIG. 1.

A block diagram providing additional detail of an example of the media monitor 118a is illustrated in FIG. 2A. The example media monitor 118a can extract metadata and audio signals associated with the presentation of media from the computing device 114a. Additionally, the media monitor 118a can generate audio signatures based on the audio signals of the media presented. The example media monitor 118a is implemented using software on the computing device 114a (e.g., a laptop computer, a desktop computer, a tablet, etc.). Additionally, the media monitor 118a is connected to the network 106 via the network gateway 120a and the modem 122c where it can upload the extracted metadata and the generated audio signature to the central facility 124.

As shown in FIG. 2A, the illustrated example media monitor 118a is implemented as software on the computing device 114a. The computing device 114a contains a browser 202 through which the panelist can view media 204. The media monitor 118a contains a media metadata extractor 206, an event metadata extractor 208, an audio receiver 210, a timestamper 212, a media monitor identifier 214, an audio signature generator 216, a log file generator 218, a data store 220, a log file reporter 222 and a timer 224.

The example browser 202 of the illustrated example of FIG. 2A is an application capable of displaying web pages from the Internet. The example browser 202 may be any type of available web browser, such as, for example, Mozilla's Firefox®, Microsoft's Internet Explorer®, Apple's Safari®, or Opera Software's Opera®. The browser 202 of the example is able to display HTML5 web pages, and receive metadata contained in the HTML5 web page. Additionally or alternatively, the example browser 202 is able to receive metadata from other types of web pages or web content, such as JavaScript content. The example browser 202 is also able to display media, such as videos embedded on websites or presented through additional third party software (e.g., Adobe's Flash®, Microsoft's Silverlight®, or Apple's QuickTime®).

The example media 204 of the illustrated example of FIG. 2A can be any form of media viewed in the browser 202 by the panelist. In some examples, the media 204 may be a video from a media provider 102 with an open media contribution website (e.g., YouTube®, Vimeo®, etc.). In such examples, the media may not contain a watermark for the audience measurement entity to identify the media 204. In other examples, the media 204 can be hosted on a curated media website, such as one run by a media provider 102 (e.g., Hulu®, etc.) In such examples, the media provider 102 may, at some time prior to, simultaneous to, or after the media 204 is released, provide audio signatures to the audience measurement entity to identify the media 204. In the illustrated example of FIG. 2A, the media 204, as delivered to the browser 202, includes metadata describing attributes of the media (e.g., title, episode, season, audio language, universal resource locator (URL)). Alternatively, the media 204 presented in the browser 202 can include audio without video (e.g., a song, a podcast, radio programming, etc.).

The example media monitor 118a of FIG. 2A includes a media metadata extractor 206 that selectively extracts the media metadata associated with an application that is presenting media (in this case, the browser 202). The media metadata extractor 206 can be configured to continually monitor metadata in the browser 202 and extract specific information that is of interest or use to the audience measurement entity. For example, the media metadata extractor 206 can be configured to determine the media provider 102 that supplied the media 204, the date and time that the metadata was loaded in the browser 202, the name of the browser 202 in which the media 204 was presented, the Uniform Resource Locator (URL) at which the media 204 was presented, the title of the media 204, the episode title of the media 204, the season title of the media 204, and/or the audio language of the media 204. The media metadata extractor 206 is capable of extracting any of these individual tags (e.g., individual metadata) in any combination, as well as additional tags that may be transmitted with the media 204. For example, in the illustrated example of FIG. 2A, there are some metadata tags which are required to be collected (e.g., the title of the media 204 and the URL at which the media 204 was presented) and others which are optionally collected (e.g., season title of the media 204). In the example of FIG. 2A, the media metadata extractor 206 specifically scans the document object model (DOM) for the specific metadata tags of interest for extraction from the document object model (DOM). In other examples, metadata can be extracted from hypertext transfer protocol (HTTP) headers or other similar communication protocol entities. Alternatively, the metadata may be extracted from third party software (e.g., Adobe's Flash®, Microsoft's Silverlight®, or Apple's QuickTime®). Additionally, any combination of the document object model, communication protocol entities, and third party software can be utilized to extract the metadata.

In the illustrated example of FIG. 2A, the media metadata extractor 206 runs continuously (e.g., scanning and extracting metadata from the document object model or HTTP headers). The media metadata extractor 206 continuously monitors pages presented by the browser 202 and extracts metadata tags corresponding to new media presented. In other examples, the media metadata extractor 206 can be configured to run only under certain conditions (e.g., a specific timeframe for data collection, a specific operating condition on the computing device 114a, a specific input to from the audience measurement entity, etc.) or to continually scan a web page for new metadata. In the example media metadata extractor 206 of FIG. 2A, the media metadata is extracted even if the media 204 is not being played, and is simply loaded on a web page.

The example event metadata extractor 208 of the illustrated example of FIG. 2A interacts with the browser 202 for extraction of playback events that occur during the presentation of media (e.g., play, pause, seek, unload, empty, abort, etc.). For example, the event metadata extractor 208 will register event handlers to extract playback event metadata from the DOM or alternative metadata source. When an event is found, the event metadata extractor 208 will extract tags including the type of event (e.g., play, pause, seek, unload, empty, abort). The example metadata extractor 208 will further extract the current time of the event, representing the time in seconds from the start of the media 204 when the event occurred. Further, the example metadata extractor 208 will also extract the date and time. Additional media metadata tags can be extracted as well. Alternatively, any polling mechanism that regularly monitors the media elements that appear in the browser 202 may be used instead of an event-based mechanism. In other examples, the media metadata extractor 206 and the event metadata extractor 208 may work in combination, or only one of the devices may be present.

The example audio receiver 210 of the illustrated example of FIG. 2A receives audio playing on the operating system of the computing device 114a. The audio received can be in any analog or digital format. In the illustrated example of FIG. 2A, the audio is continually collected from the computing device 114a while it is in use. Alternatively, the audio receiver 210 could be configured to only collect audio when the event metadata extractor 208 finds that a new start event has occurred, and to cease receiving the audio when the event metadata extractor 208 finds that an end, pause or unload event has occurred. In the illustrated example of FIG. 2A, the audio received by the audio receiver 210 is not stored, but rather processed immediately by the audio signature generator 216. In other examples, the audio received by the audio receiver 210 may be temporarily or permanently stored in the data store 220.

The example timestamper 212 of the illustrated example of FIG. 2A timestamps audio signatures generated by the audio signature generator 216, for the audio of the media 204 to eventually be associated with the metadata. In the illustrated example of FIG. 2A, the timestamper 212 assigns timestamps to each audio file in the same format as the time is logged in the metadata by the event metadata extractor 208 and/or the media metadata extractor 206 to facilitate future comparison. In the example illustrated in FIG. 2A, the audio signatures generated by the audio signature generator 216 are timestamped during the signature generation process by the software library. Additionally, the timestamper 212 applies timestamps to the metadata in the log files generated by the log file reporter 222. In the example illustrated in FIG. 2A, the timestamps are applied in UTC (Coordinated Universal Time) format. Alternatively, the timestamps may be applied in any format, and may be applied to the data at alternative locations (e.g., the data store 220, the audio receiver 210, the media metadata extractor 206, etc.).

The example media monitor identifier 214 of the illustrated example of FIG. 2A assigns the data collected by the media monitor 118a to the identifying information of the media monitor 118a. For example, the media monitor identifier 214 assigns all data collected and transmitted by the media monitor 118a to a unique identifier for both the panelist household 108a and the specific media monitor 118a. Alternatively, identification of the media monitor may occur in any of the other components within the media monitor 118a (e.g., the timestamper 212, the audio receiver 210, etc.). In the example illustrated in FIG. 2A, the identification information is additionally appended to the log file generated by the log file generator 218.

The example audio signature generator 216 of the illustrated example of FIG. 2A takes the audio received by the audio receiver 210 and creates audio signatures representing the specific media 204. In the illustrated example of FIG. 2A, the audio signature generator 216 continually generates audio signatures. In such examples, audio signatures are generated by the audio signature generator 216 from audio presented by the media device while the metadata is collected by the media metadata extractor 206 and the event metadata extractor 208. Example systems for identifying media based on codes and/or signatures are long known and were first disclosed in Thomas, U.S. Pat. No. 5,481,294, which is hereby incorporated by reference in its entirety. After the generation of the audio signatures, the audio signatures are temporarily stored in the data store 220. In alternative examples, the audio receiver 210 and the audio signature generator 216 can be combined.

The example log file generator 218 of the illustrated example of FIG. 2A receives the media metadata from the media metadata extractor 206, receives the event metadata from the event metadata extractor 208, receives the audio signatures from the audio signature generator 218 and creates a log file. The log file generator 218 will create a file for media which are presented on the computing device 114a while the media monitor 118a is in operation. In the illustrated example of FIG. 2A, the log file generator 218 creates a new file for each instance of a new media play start that occurs. Alternatively, the log file may rotated (e.g., a current log file completed and a new file began) based upon other criteria (e.g., a specified time interval, a specified maximum log file size, etc.). The log file that is generated contains information extracted from the event metadata extractor 208, the media metadata extractor 206 and the signatures generated by the audio signature generator 218. In the example, the information from the media metadata extractor 206 that is included in the log file that is generated by the log file generator 218 includes the title, episode, season, audio language, provider, URL, the total duration of the media and timestamp of the beginning of the media. Additionally or alternatively, other information extracted from the metadata may be included in the file generated by the log file generator 218. The example log file generator 218 also includes information on the signatures generated for the specific media. For example, the local time of the collected signatures, time duration of the signature, delta value and peak value are all included in the file. In the example illustrated in FIG. 2A, the log file generator 218 also pulls information originally from the media monitor identifier 214 to include in the log file, such as the computer ID and meter ID. In other examples, the log file generator 218 may include the previously mentioned data in different formats, or only include certain elements of the metadata and audio signatures. In further examples, the metadata may be represented in the file without any information pertaining to the audio signatures, which may only be transmitted separately without logging to a file. After the log file has been generated, the file can be stored in the data store 220, for example.

The example data store 220 of the illustrated example of FIG. 2A is a device for storing data such as, for example, flash memory, magnetic media, optical media, etc. In some examples, the data store 220 stores both temporary files, such as audio that has been received prior to generation of an audio signature being generated. Additionally or alternatively, the data store 220 can be used to store metadata, audio signatures, and log files prior to processing or transmitting to the central facility 124. Furthermore, the data stored in the data store 220 may be in any data format such as, for example, binary data, comma delimited data, tab delimited data, structured query language (SQL) structures, etc. While, in the illustrated example, the data store 220 is illustrated as a single database, the data store 220 may be implemented by any number and/or types(s) of databases.

The log file reporter 222 of the illustrated example of FIG. 2A transmits network communications data stored in the data store 220. Further, the log file reporter 222 is implemented by a processor executing instructions, but it could alternatively be implemented by an application specific integrated circuit(s) (ASIC), digital signal processor (DSP), field programmable logic device (FPLD), or other circuitry. The log file reporter 222 of the illustrated example periodically, a-periodically, or continually transmits data from the data store 220 to the central facility 124 via the network gateway 120a. Alternatively, the log file reporter 222 can transmit data from the data store 220 to the central facility 124 in response to a stimulus (e.g., a new log file completion).

The example timer 224 of the illustrated example of FIG. 2A times both the interval at which data is stored to the log file as well as the interval at which the log file is reported to the central facility 124. In the illustrated example of FIG. 2A, the interval at which the metadata and audio signatures are written to a log file is configurable. Additionally, the interval at which the log file is reported to the central facility 124 is configurable, allowing for the uploading to be adjusted based on the data storage capabilities of the data store 220. The example timer 224 counts up to the threshold interval, at which point the relevant task is executed by the log file generator 218 (in the case of logging data) or the log file reporter 222 (in the case of uploading data to the central facility 124). In both events, the timer for each task is reset upon the completion of the relevant task. In other examples, the timer may be configured to provide In operation, the browser(s) 202 receive media 204 and/or metadata to be displayed on the computing device 114a. Within the media monitor 118a, which is implemented via software on the computing device 114a, the media metadata extractor(s) 206 extract descriptive metadata for the media 204 (e.g., title, episode, season, language, etc.). The event metadata extractor(s) 208 extracts event metadata for the media 204, gathering time information for media playback events (e.g., play, pause, seek, etc.). The audio receiver(s) 210 of the example of FIG. 1 receive audio from the operating system for the media 204. The timestamper(s) 212 add timestamps to the data metadata and audio signatures for future use in comparing the metadata and audio signatures for attribution. The media monitor identifier 214 appends identification information for the media monitor 118a as well as the user to data processed in the media monitor 118a. The audio signature generator 216 performs numerous transformations and manipulations on the audio received by the audio receiver 210 to generate audio signatures.

The log file generator 218 combines information from the media metadata extractor 206, the event metadata extractor 208, and the audio signatures from the audio signature generator 216 to create a log file which contains both descriptive information of the media (e.g., title, episode, season, audio language, etc.) and playback events which have occurred, along with their timestamps (e.g., play, pause, stop, abort, etc.). The log file reporter 222 transmits both the log file from the log file generator 218 to the network gateway 120a to be sent to the central facility 124.

While an example manner of implementing the media monitor 118a of FIG. 1 is illustrated in FIG. 2A, one or more of the elements, processes and/or devices illustrated in FIG. 2A may be combined, divided, re-arranged, omitted, eliminated and/or implemented in any other way. Further, the example media metadata extractor 206, the example event metadata extractor 208, the example audio receiver 210, the example timestamper 212, the example media monitor identifier 214, the example audio signature generator 216, the example log file generator 218, the example data store 220, the example log file reporter 222, the example timer 224 and/or, more generally, the example media monitor 118a of FIG. 2A may be implemented by hardware, software, firmware and/or any combination of hardware, software and/or firmware. Thus, for example, any of the example media metadata extractor 206, the example event metadata extractor 208, the example audio receiver 210, the example timestamper 212, the example media monitor identifier 214, the example audio signature generator 216, the example log file generator 218, the example data store 220, the example log file reporter 222, the example timer 224 and/or, more generally, the example media monitor 118a could be implemented by one or more analog or digital circuit(s), logic circuits, programmable processor(s), ASIC(s), and/or programmable logic device(s) (PLD(s)) and/or (FPLD(s)). When reading any of the apparatus or system claims of this patent to cover a purely software and/or firmware implementation, at least one of the example media metadata extractor 206, the example event metadata extractor 208, the example audio receiver 210, the example timestamper 212, the example media monitor identifier 214, the example audio signature generator 216, the example log file generator 218, the example data store 220, the example log file reporter 222, the example timer 224 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media monitor 118a of FIG. 2A may include one or more elements, processes and/or devices in addition to, or instead of, those illustrated in FIG. 2A, and/or may include more than one of any or all of the illustrated elements, processes and devices.

Figure 2B:
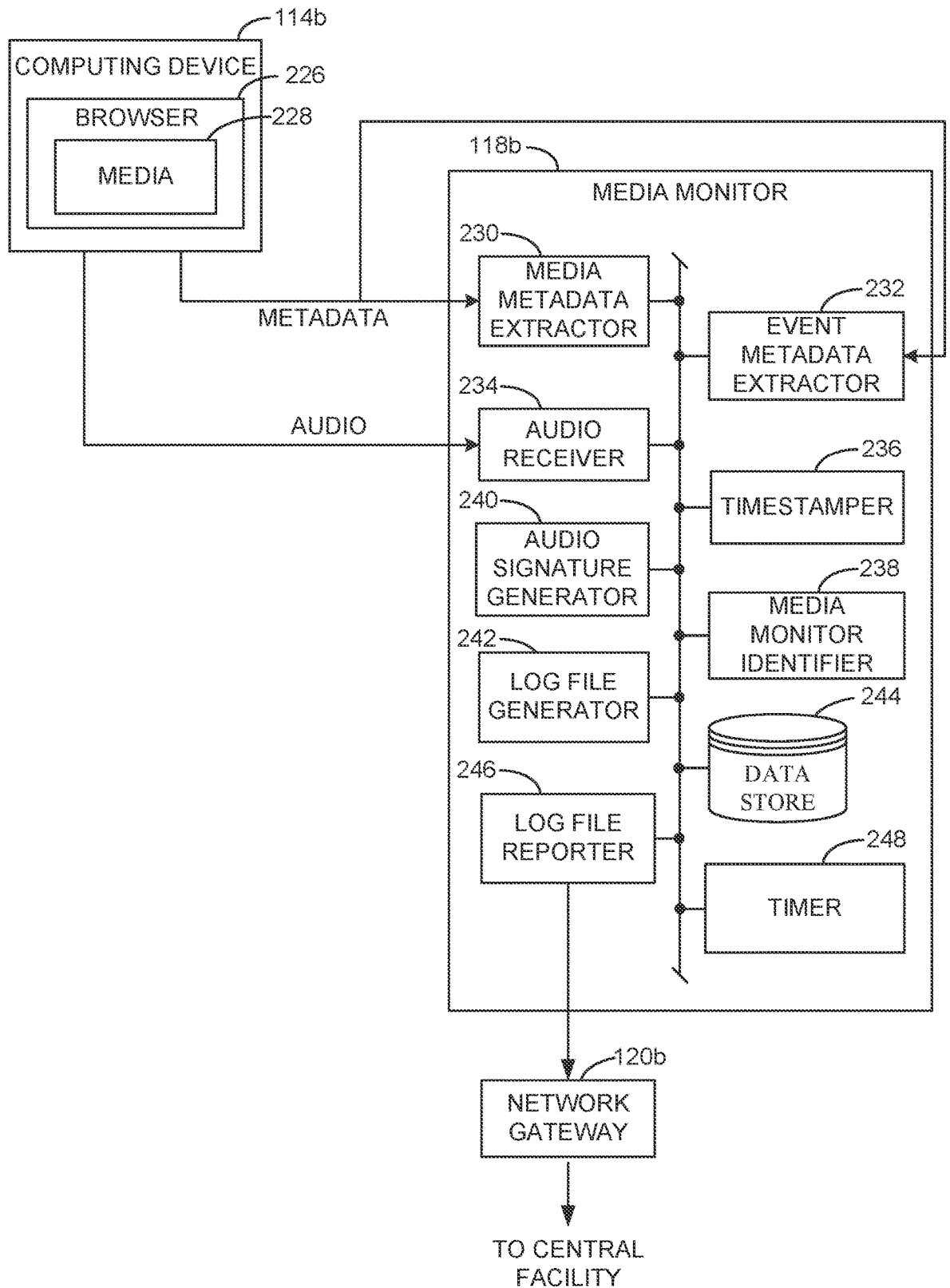
FIG. 2B is a block diagram showing additional detail of the alternative example media monitor of FIG. 1.

A block diagram providing additional detail of an example of the media monitor 118b of the second panelist household 108b is illustrated in FIG. 2B. As with the example from FIG. 2A, the example media monitor 118b can extract metadata and receive audio signals associated with the presentation of media from the computing device 114b. Additionally, the media monitor 118b can generate audio signatures based on the audio signals of the media presented. The example media monitor 118b is implemented using a combination of hardware, firmware and software. Additionally, the media monitor 118b is connected to the network 106 via the network gateway 120b and the modem 122b where it can upload the extracted metadata and the generated audio signature to the central facility 124.

As shown in FIG. 2B, the computing device 114b utilizes a browser 226 that facilitates presentation of media 228. In the example of FIG. 2B, the media monitor 118b exists as a separate, standalone device. The media monitor 118b contains a media metadata extractor 230, an event metadata extractor 232, an audio receiver 234, a timestamper 236, a media monitor identifier 238, an audio signature generator 240, a log file generator 242, a data store 244, a log file reporter 246, and a timer 248.

The example illustrated in FIG. 2B is configured to perform substantially the same functions as the example illustrated in FIG. 2A, except with the media monitor 118b being a separate device from the computing device 114b and being implemented using a combination of software, firmware and hardware. For example, the media monitor can be implemented in a set-top box, media device component, networking component (e.g., modem) or any other implementation involving hardware that can be used to receive and process the audio and the metadata. In the example illustrated in FIG. 2B, the individual components of both the computing device 114b (e.g., the browser 226 and media 228) and the media monitor 118a (e.g., the media metadata extractor 230, the event metadata extractor 232, the audio receiver 234, the timestamper 236, the media monitor identifier 238, the audio signature generator 240, the log file generator 242, the data store 244, the log file reporter 246, and the timer 248) are intended to serve the same function as described in FIG. 2A. For brevity, only the components which have distinguished differences in the illustrated example of FIG. 2B are further expanded upon herein. All other components can be taken to be of the same essence and spirit of the identically named components in FIG. 2A.

The example audio receiver 234 of FIG. 2B is a recording device that records sound output from the computing device 114b. In this example, the audio receiver 234 uses a microphone or other sensor and must be in the vicinity of the computing device 114b, and the media 228 must be presented utilizing speakers or another clearly audible sound output device. In alternative examples, the audio receiver 234 may be wired to the computing device 114b (e.g., via an auxiliary cable) or may wirelessly receive audio signals from the computing device 114b.

While an example manner of implementing the media monitor 118b of FIG. 1 is illustrated in FIG. 2B, one or more of the elements, processes and/or devices illustrated in FIG. 2B may be combined, divided, re-arranged, omitted, eliminated and/or implemented in any other way. Further, the example media metadata extractor 230, the example event metadata extractor 232, the example audio receiver 234, the example timestamper 236, the example media monitor identifier 238, the example audio signature generator 240, the example log file generator 242, the example data store 244, the example log file reporter 246, the example timer 248 and/or, more generally, the example media monitor 118b of FIG. 2B may be implemented by hardware, software, firmware and/or any combination of hardware, software and/or firmware. Thus, for example, any of the example media metadata extractor 230, the example event metadata extractor 232, the example audio receiver 234, the example timestamper 236, the example media monitor identifier 238, the example audio signature generator 240, the example log file generator 242, the example data store 244, the example log file reporter 246, the example timer 248 and/or, more generally, the example media monitor 118b could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, media metadata extractor 230, the example event metadata extractor 232, the example audio receiver 234, the example timestamper 236, the example media monitor identifier 238, the example audio signature generator 240, the example log file generator 242, the example data store 244, the example log file reporter 246, the example timer 248 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media monitor 118b of FIG. 2B may include one or more elements, processes and/or devices in addition to, or instead of, those illustrated in FIG. 2B, and/or may include more than one of any or all of the illustrated elements, processes and devices.

Figure 3:
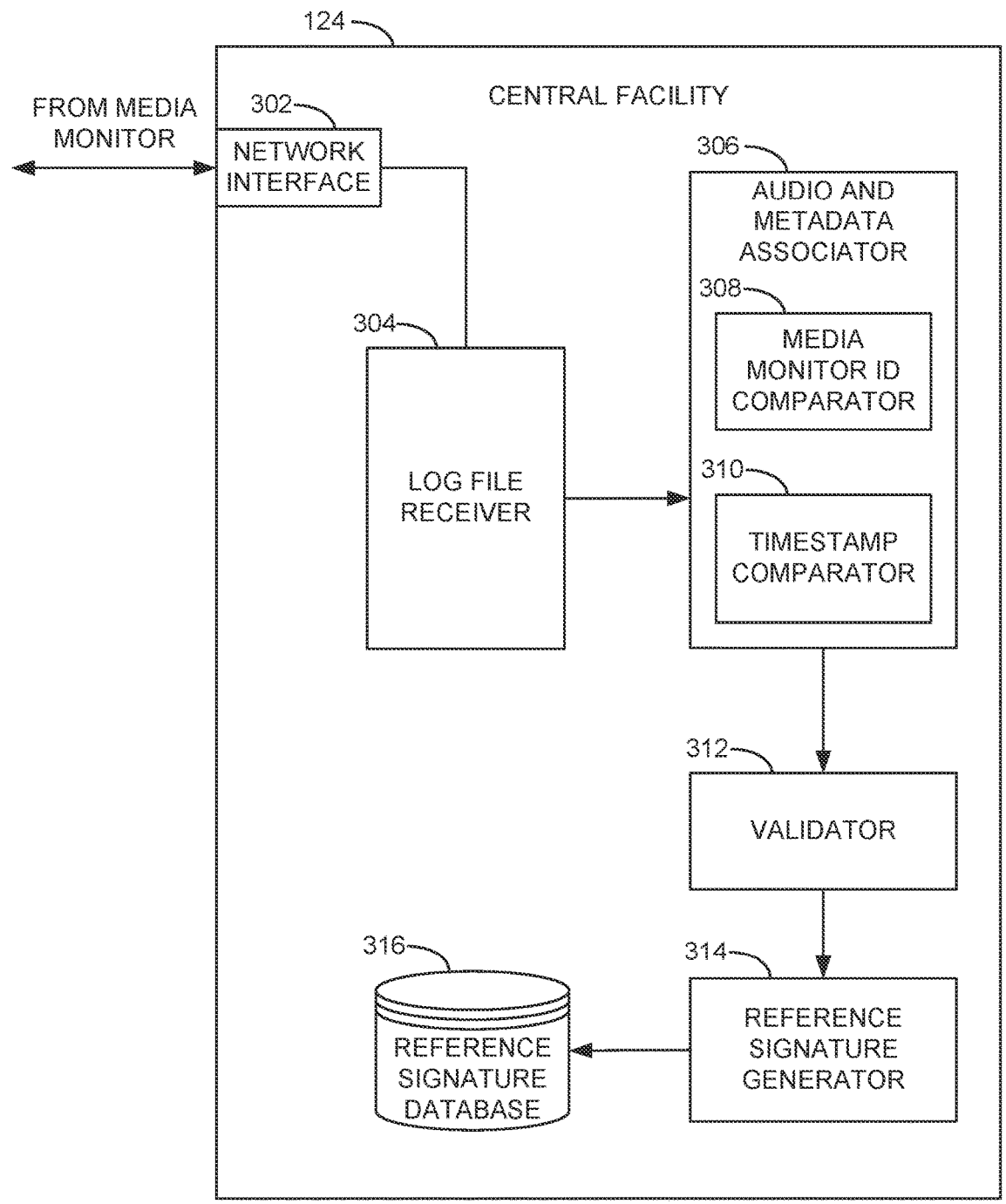
FIG. 3 is a block diagram showing additional detail of the example central processing facility of FIG. 1.

A block diagram providing additional detail of the central facility 124 is illustrated in FIG. 3. The central facility 124 receives data from the media monitor(s) 118a, 118b and 118c belonging to the respective panelist households 108a, 108b and 108c. The data is transmitted through the network gateway(s) 120a, 120b and 120c and then through the modem(s) 122a, 122b and 122c and finally through the network 106 before arriving at the central facility 124.

Looking to the example illustrated in FIG. 3, the central facility 124 has a network interface 302 to receive data. The central facility 124 also includes a log file receiver 304. The example illustrated in FIG. 3 also includes an audio and metadata associator 306 within the central facility 124. Within the audio and metadata associator 306 is a media monitor ID comparator 308 and a timestamp comparator 310. The central facility also includes a validator 312, a reference signature generator 314 and a reference signature database 316.

The example illustrated in FIG. 3 includes a network interface 302 that allows the central facility 124 to communicate with the network 106. In some examples, the network interface 302 includes modem capabilities. In other examples, the example network interface 302 is implemented in two or more devices (e.g., a router, a modem, a switch, a firewall, etc.). In further examples, the network interface 302 hosts a local area network (LAN) or a wireless local area network (WLAN) for the central facility 124.

The example log file receiver 304 of the illustrated example in FIG. 3 receives log files generated at the media monitor(s) 118a, 118b and/or 118c. The log file receiver is configured to identify and discern log files among the incoming traffic to the central facility 124 and route the log files to the audio and metadata associator 306. In alternative examples, the log file receiver may be configured to identify individual data streams (e.g., media metadata, event metadata, audio signatures, etc.) which are transmitted separately, as opposed to in a single log file. In other examples, the log file receiver may actually be separate receivers for identification and routing of each of the separate incoming data types, or some other combination of incoming data. The log file, or the metadata and audio signature data streams individually, may be received by the log file receiver 304 in periodic increments, in response to an event, or continually as the data is generated and/or collected.

The example audio and metadata associator 306 of the illustrated example in FIG. 3 receives the log file from the log file receiver 304 and performs tasks to attempt to match the audio signature(s) contained in the log file with corresponding metadata in the log file. The objective of the audio and metadata associator 306 is to find the set(s) of data that correspond to the same user and the same media content within the log file received. In order to do this, in the example of FIG. 3, the audio and metadata associator 306 has two aspects: a media monitor ID comparator 308 and a timestamp comparator 310. In other examples, additional steps may be necessary to associate the two separate data streams, or in other examples fewer steps may be necessary in order to associate the two separate data streams. The audio and metadata associator 306, in other examples, may additionally or alternatively include the validator 312 and the reference signature generator 314. While the example audio and metadata associator 306 of FIG. 3 examines the data within the log file, in alternative examples the audio and metadata associator 306 can examine separate data streams to find corresponding audio signatures and metadata. The output of the audio and metadata associator 306 is either an associated log file, which is verified to contain audio signatures and metadata that correspond to a same media, or else a discarded log file. Additionally or alternatively, the output of the audio and metadata associator 306 can be a modified log file, utilizing certain aspects of the metadata and the audio signatures based on partial matches.

The example media monitor ID comparator 308 of the illustrated example in FIG. 3 compares the media monitor ID and/or user ID appended to the log file and the audio signature(s) to ensure that the data comes from the same user. The media monitor ID comparator 308 performs one level of comparison for determining that specific metadata should be associated with specific audio signature(s). The example media monitor ID comparator 308 ensures that the IDs are both matching between a set of metadata and audio signatures under comparison, or else discards the data if a match is not available. Alternatively, the example media monitor ID comparator 308 can check for a match between a set of metadata and audio signatures and if one is not found, continue scanning for the matching data and/or relegate the unmatched data to a data store.

The example timestamp comparator 310 of the illustrated example in FIG. 3 compares the timestamps associated with the audio signature(s) and the log file to determine the appropriate audio signature(s) pertaining to the media that the metadata describes. The timestamp comparator 310 checks the event metadata to determine specifically when media is being played and when it is stopped, paused, unloaded or otherwise not being presented. In the example illustrated in FIG. 3, the media play time can additionally be verified with the media metadata that has been extracted, as the media metadata may contain a first presented time (e.g., a timestamp for when the media metadata was loaded).

The example timestamp comparator 310 then identifies audio signatures generated during or at the limits of this time frame that correspond to the media presentation. Further, the timestamp comparator 310 can be configured using multiple thresholds or tolerances. For example, the timestamp comparator 310 may find that the metadata collected on the media presented indicates the media plays from 10:01:55-10:05:64. In this example, the timestamp comparator 310 can look for audio signatures generated in this time frame using the associated timestamps. However, in one example, the audio signatures from the audio signature generator 216 as illustrated in FIG. 2A may be generated in 15 seconds of sample time. Hence, at both the beginning and the end of the media presentation period, there will be an imperfect match where partial audio signatures may be contained within the time frame. The timestamp comparator 310 can be configured to set an appropriate threshold of acceptable timestamp variance based upon the sampling rate of the audio signature generator 216 illustrated in FIG. 2A. Additionally, the central facility 124 of the illustrated example in FIG. 3 can contain additional components, or additional functionality of the components included herein, to perform processing that accounts for any offset in the timestamps of the metadata and the timestamps of the audio signatures.

The example validator 312 of the illustrated example of FIG. 3 performs validations steps to determine if the metadata and audio that has been received is acceptable to serve as a valid reference signature. For example, the validator 312 checks that the media 204 detected is from a predefined list of media providers. Additionally, in the example, the validator 312 checks that the media has been presented in a browser 202 which is supported by checking a predefined list. The example validator 312 also checks that the number of usages of seek, based on the event metadata, is less than a predefined value.

The example validator 312 also checks that the viewed duration is less than the total media length and that the difference of total length minus the viewed duration is less than or equal to a predefined value. In other examples, these validation steps may be different, and may completely disallow seek events, or other events which can impede the quality of the audio received or the metadata information collected. In other examples, the validator 312 may check entirely separate criteria (e.g., whether the media is interrupted by advertisements, whether the media audio is of a specified language, etc.). If the validator 312 finds that the specific metadata it is examining meets the criteria, it will indicate that the validation has passed, a necessary condition for the creation of a reference signature. If the validator 312 finds that the specific metadata it is examining has not passed, it will discard the data.

The example reference signature generator 314 generates reference signature(s) by taking the audio signatures which have passed through the audio and metadata associator 306 and the validator 312 and attributing descriptive information from the associated metadata to the audio signature(s). Additionally or alternatively, the reference signature generator can compress the log file in order to minimize the storage space utilized in the reference signature database 316. In other examples, any method may be utilized to associate the filtered and corresponding audio signature to the appropriate metadata. Additionally, in other examples, the reference signatures may be transmitted to another facility or stored in another location aside from the reference signature database 316.

The example reference signature database 316 permits storage of reference signatures generated by the reference signature generator 314. For example, the reference signature database stores reference signatures of any type of media detected by the media monitor 118a which has passed through the various validation steps of the validator 312, indicating specific media types and providers. In some examples, the reference signature database is accessible to queries by other media monitors to perform comparison tasks of audio signatures generated on the media monitors 118a-c with reference audio signatures stored in the reference signature database 316. The reference signature database 316 stores the audio signatures in a format pre-determined by the audience measurement entity. In other examples, the reference signatures can be stored in any format that allows for comparison with incoming audio signatures requiring comparison.

In operation, the network interface 302 receives data from the media monitors 118a-c through a combination of network gateways 120a-c, modems 122a-c and the network 106. The log file receiver 304 receives audio signatures and metadata in a log file and routes them to the audio and metadata associator 306. The audio and metadata associator 306 performs tasks to compare and associate the received metadata with any corresponding received audio signature(s). The media monitor ID comparator 308 performs comparisons of the media monitor ID appended to the log file with the audio signatures to ensure a match. The timestamp comparator 310 determines sections of the metadata which match the audio signatures collected based on the timestamps attributed to the metadata and the audio signatures. The validator 312 checks several configurable conditions to ensure that the metadata and audio signatures match several criteria. The reference signature generator 314 then takes the validated audio signatures and the associated metadata and generates a reference signature. The reference signature is then stored in the reference signature database 316 until either further processing or use in comparing incoming query signatures from the media monitors 118a-c.

While an example manner of implementing the central facility 124 of FIG. 1 is illustrated in FIG. 3, one or more of the elements, processes and/or devices illustrated in FIG. 3 may be combined, divided, re-arranged, omitted, eliminated and/or implemented in any other way. Further, the example network interface 302, the example log file receiver 304, the example audio and metadata associator 306, the example media monitor ID comparator 308, the example timestamp comparator 310, the example validator 312, the example reference signature generator 314, the example reference signature database 316 and/or, more generally, the example central facility 124 of FIG. 3 may be implemented by hardware, software, firmware and/or any combination of hardware, software and/or firmware. Thus, for example, any of the example network interface 302, the example log file receiver 304, the example audio and metadata associator 306, the example media monitor ID comparator 308, the example timestamp comparator 310, the example validator 312, the example reference signature generator 314, the example reference signature database 316 and/or, more generally, the example central facility 124 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example network interface 302, the example log file receiver 304, the example audio and metadata associator 306, the example media monitor ID comparator 308, the example timestamp comparator 310, the example validator 312, the example reference signature generator 314, the example reference signature database 316 is/are hereby expressly defined to include a non-transitory computer readable storage device or storage disk such as a memory, a digital versatile disk (DVD), a compact disk (CD), a Blu-ray disk, etc. including the software and/or firmware. Further still, the example central facility 124 of FIG. 3 may include one or more elements, processes and/or devices in addition to, or instead of, those illustrated in FIG. 4, and/or may include more than one of any or all of the illustrated elements, processes and devices.

Figure 4:
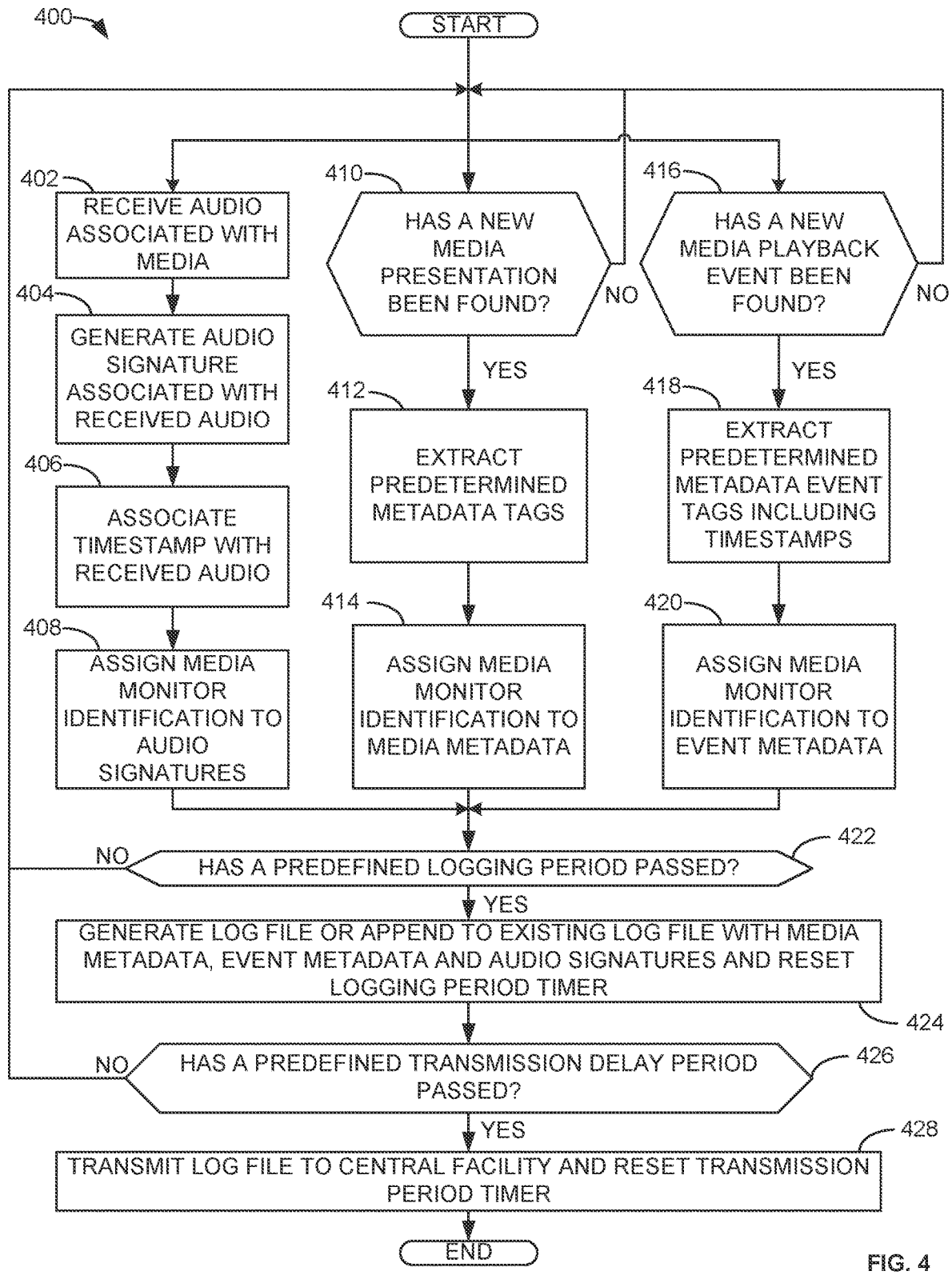
FIG. 4 is a flowchart representative of example machine readable instructions that may be executed to implement the example media monitor of FIGS. 2A and 2B.

A flowchart representative of example machine readable instructions for implementing the media monitor 118a of FIG. 2A and media monitor 118b of FIG. 2B is shown in FIG. 4. In this example, the machine readable instructions comprise a program for execution by a processor such as the processors 712 or 812 shown in the example processor platform 700 or 900 discussed below in connection with FIG. 4.

The program may be embodied in software stored on a non-transitory computer readable storage medium such as a CD-ROM, a floppy disk, a hard drive, a digital versatile disk (DVD), a Blu-ray disk, or a memory associated with the processor 712 or 812, but the entire program and/or parts thereof could alternatively be executed by a device other than the processor 712 or 812 and/or embodied in firmware or dedicated hardware. Further, although the example program is described with reference to the flowchart illustrated in FIG. 4, many other methods of implementing the example media monitor 118a of FIG. 2A and media monitor 118b of FIG. 2B may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Example machine readable instructions 400 that may be executed to perform the collection of metadata, generation of audio signatures and transmission of a log file containing both the metadata and audio signatures in the example media monitor 118a of FIG. 2A are illustrated in FIG. 4. With reference to the preceding figures and associated descriptions, the example machine readable instructions 400 of FIG. 4 begin with example audio receiver 210, 234 receiving audio from the example computing device 114a, 114b containing audio of media 204, 228 (block 402).

At block 404, the example audio signature generator 216, 240 performs transformations on the audio received by the audio receiver 210, 234 to generate an audio signature. In the example, any method for generating an audio signature may be utilized. Methods of generating audio signatures are long known and were first disclosed in Thomas, U.S. Pat. No. 5,481,294, which is hereby incorporated by reference in its entirety.

At block 406, the example timestamper 212, 236 applies a timestamp to the generated audio signature. The timestamps applied to the audio signatures generated should denote at least the start and stop times of the media that has been presented. In some examples, the timestamp may be applied for every audio signature generated. In other examples, the audio signature may be applied for only an audio signature that represents a detected new media presentation, an ended media presentation, or a playback event.

At block 408, the example media monitor identifier 214, 238 assigns identification information for the household and the user to the generated audio signature.

At block 410, the example media metadata extractor 206, 230 determines if a new media presentation has been found. The example media metadata extractor 206, 230 scans the metadata source (e.g., the document object model) and compares any metadata tags associated with media with media metadata tags which have already been extracted to determine if a new media presentation is being presented. In response to a new media presentation being found, processing transfers to block 412. Conversely, if no new media presentation has been found, processing remains at block 410.

At block 412, the example media metadata extractor 206, 230 extracts predetermined metadata tags pertaining to the new media 204, 228 being presented from the overall metadata of the web page or media.

At block 414, the example media monitor identifier 214, 238 assigns identification information for the household and the user to the extracted media metadata.

At block 416, the example event metadata extractor 208, 232 determines if a new media playback event has been found. The example event metadata extractor 208, 232 compares any metadata tags associated with a media playback event to those event metadata tags which have already been extracted to determine if a new event has been found. In response to a new media playback event being found, processing transfers to block 418. Conversely, if no new media playback event is found, processing remains at block 416.

At block 418, the example event metadata extractor 208, 232 extracts predetermined metadata event tags including timestamps indicating the time at which playback event(s) occurred.

At block 420, the example media monitor identifier 214, 238 assigns identification information for the household and the user to the event metadata.

At block 422, the example timer 224, 248 determines whether a predefined logging period has passed. This logging period is configurable, and is tracked using a continuous timer 224, 248 while the example media monitor 118a, 118b is in operation. The logging period represents the time interval at which the extracted metadata and generated audio signatures should be entered into a log file. If the predefined logging period has passed, according to the timer 224, 248, processing transfers to block 424. Conversely, if the predefined logging period has not passed, processing transfers to blocks 402, 410 and 416.

At block 424, the example log file generator 218, 242 generates a log file containing the audio signatures that have been generated, the media metadata that has been collected, and the event metadata that has been collected during the current logging period. Alternatively, if a log file pertaining to the specific media being presented already exists, the generated audio signatures, collected media metadata and collected event metadata can be appended to the existing log file pertaining to this media. Upon completion of either the generation of a new log file or the appending of data to an existing log file, the example timer 224, 248 resets the logging period timer and begins timing again up until the predefined logging period.

At block 426, the example timer 224, 248 determines whether a predefined transmission delay period has passed. This transmission delay period is configurable, and is tracked using a continuous timer while the example media monitor 118a, 118b is in operation. The transmission delay period represents the time interval at which the log file should be transferred to the central facility. If the predefined transmission delay period has passed, according to the timer 224, 248, processing transfers to block 428. Conversely, if the predefined logging period has not passed, processing transfers to blocks 402, 410 and 416.

At block 428, the example log file reporter transmits the log file to the example central facility 124. Upon initiation of the transmission of the log file to the example central facility 124, the example timer 224, 248 resets the transmission period timer and begins timing again up until the predefined transmission period.

The example machine readable instructions 400 may additionally be executed to perform the collection of metadata, generation of audio signatures, and transmission of a log file containing both metadata and audio signatures in the example media monitor 118b of FIG. 2B. The instructions can be executed using the components of the same name and function as those components in FIG. 2A.

Figure 5:
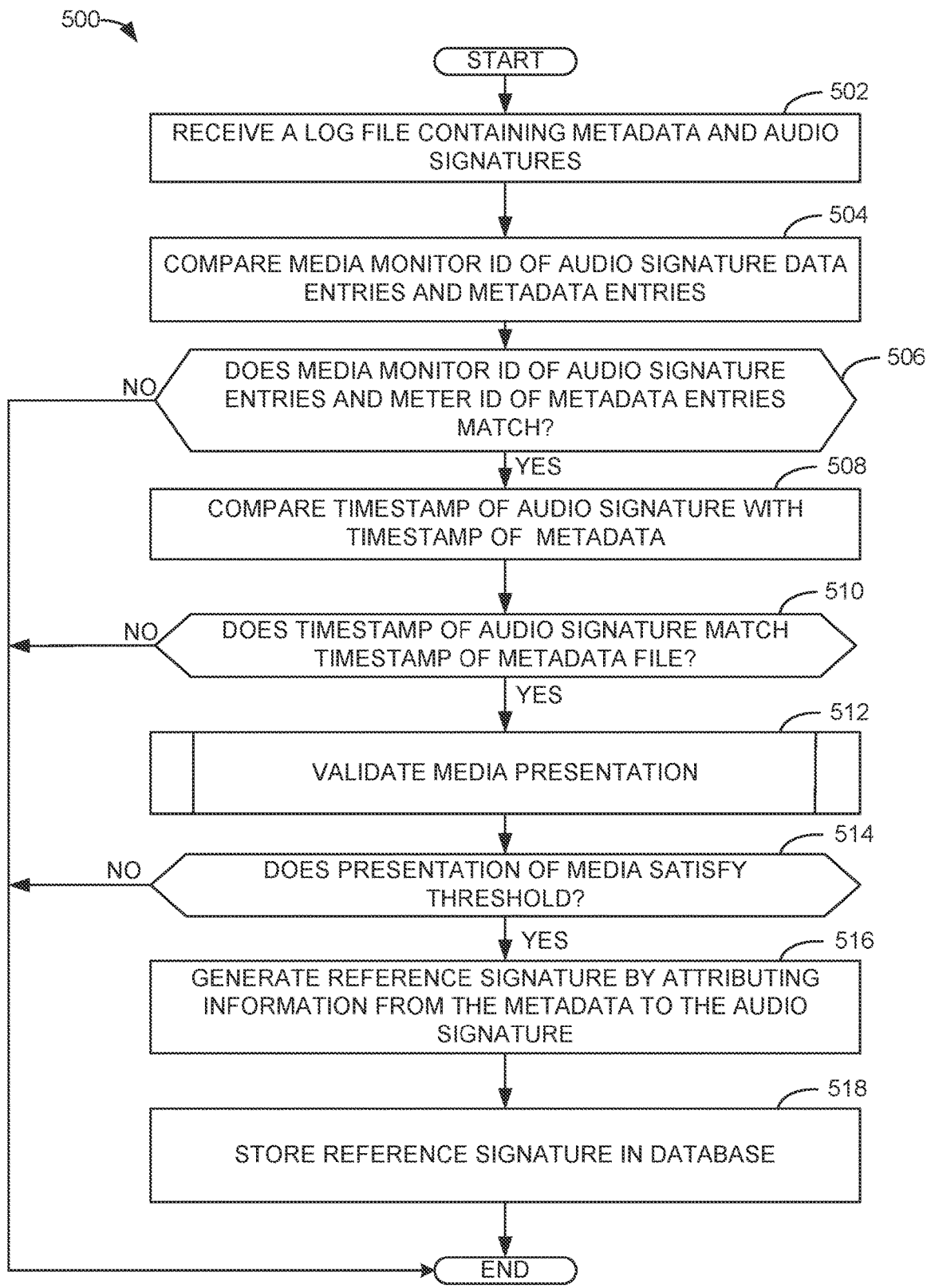
FIG. 5 is a flowchart representative of example machine readable instructions that may be executed to implement the example central facility of FIG. 3.

A flowchart representative of example machine readable instructions for implementing the central facility 124 of FIG. 3 is shown in FIG. 5. In this example, the machine readable instructions comprise a program for execution by a processor such as the processor 912 shown in the example processor platform 900 discussed below in connection with FIG. 5. The program may be embodied in software stored on a non-transitory computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 5, many other methods of implementing the example central facility 124 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIG. 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Example machine readable instructions 500 that may be executed to perform the generation of reference signatures from audio signatures and metadata in the central facility of FIG. 3 are illustrated in FIG. 5. With reference to the preceding figures and associated descriptions, the example machine readable instructions of FIG. 5 begin execution at block 502 at which the example log file receiver 304 receives a log file containing metadata and audio signatures. The example log file received also contains timestamps for both the audio signatures as well as metadata pertaining to media playback events.

At block 504, the example media monitor ID comparator 308 compares the media monitor ID entries for both the audio signatures contained in the log file and the metadata entries in the log file. The example media monitor ID comparator 308 compares the audio signature entries to each other, to ensure the audio signatures represent the same media monitor 118a, 118b or 118c, as well as the same household and user. The example media monitor ID comparator 308 also compares the media monitor ID of the metadata entries to the other metadata entries in the file. Further, the example media monitor ID comparator 308 compares the media monitor ID of the metadata entries to the media monitor ID of the audio signature entries. Additionally or alternatively, the example media monitor ID comparator 308 compares the metadata media monitor ID to the audio signature media monitor ID.

At block 506, the example media monitor ID comparator 308 determines whether the media monitor ID entries of the audio signatures and the metadata both match other audio signature and metadata entries within the same file, as well as match each other. In response to all of the media monitor ID entries within the log file matching, processing transfers to block 508. Conversely, if any of the media monitor ID entries do not match, the example method concludes.

At block 508, the example timestamp comparator 310 compares the timestamps of the metadata with the timestamps of the audio signatures. The metadata in the log file indicates timestamps for the beginning and end of a media file, as well as any intermediary playback events. The example timestamp comparator 310 compares these timestamps with timestamps of audio signatures within the log file to determine the audio signatures that pertain to a specific media presentation.

At block 510, the example timestamp comparator 310 determines if the audio signature timestamps match, or fall in-between the timestamps of the metadata. If the audio signature(s) timestamps match or fall in-between the metadata's timestamps for the media, processing transfers to block 512. Conversely, if the audio signatures timestamps fall outside of the range of the metadata's timestamps for the media, the method concludes.

Figure 6:
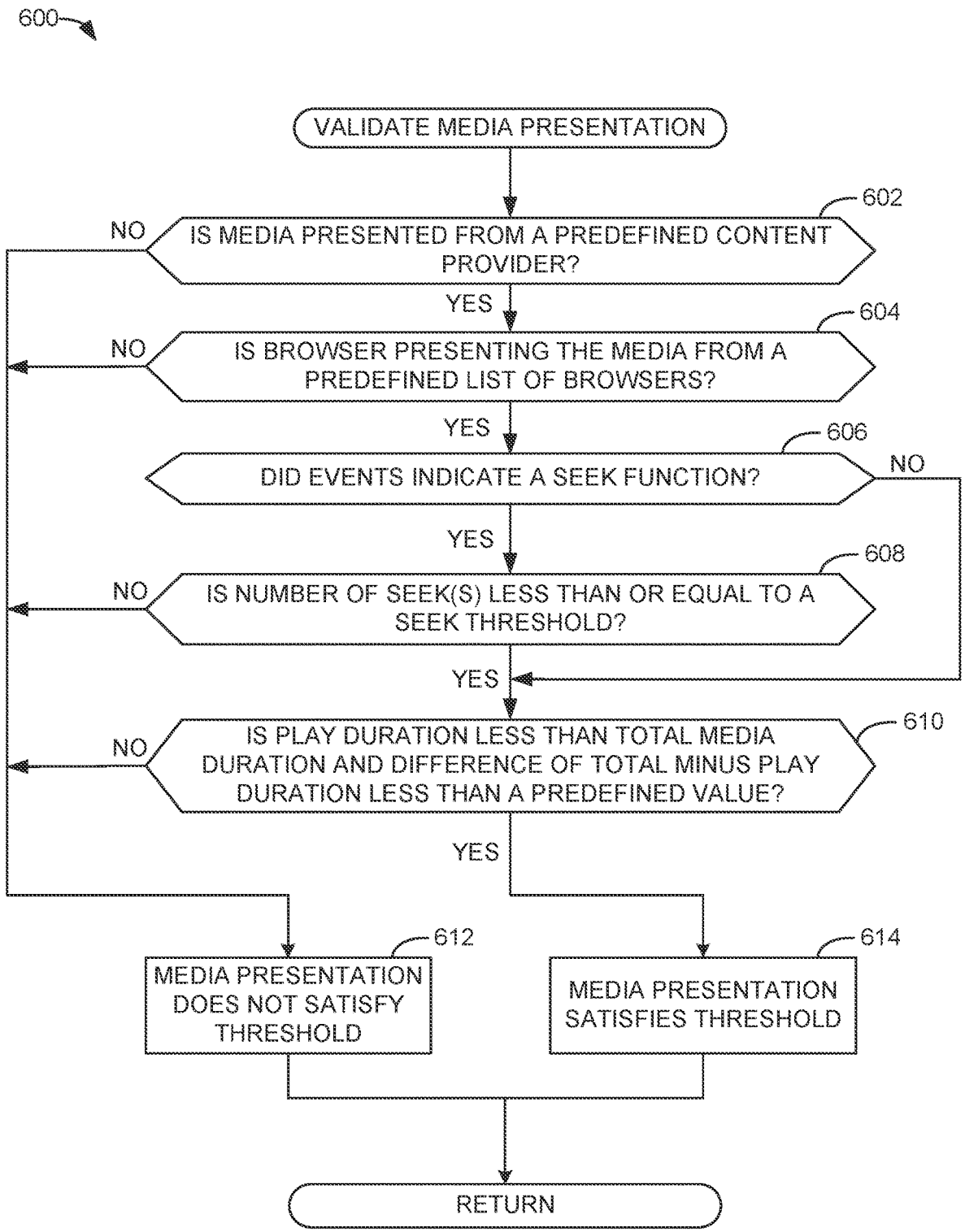
FIG. 6 is a flowchart representative of example machine readable instructions that may be executed to implement a validation process of the example flowchart of FIG. 5.

Further detail regarding an example process that may be used to implement the validate media presentation process (block 512), is provided in FIG. 6.

At block 514, the example validator 312 determines whether the threshold for the data to contribute to a reference audio signature has been met, as indicated by the process of FIG. 6. If the threshold has been met, processing transfers to block 516. Conversely, if the threshold has not been met, the method concludes.

At block 516, the example reference signature generator 314 generates a reference signature for the data that has passed through the validator 312. The reference signature generator 314 takes the audio signatures that were determined to be within the time-range of the media presentation, based upon the timestamp comparator, and assigns the metadata of that media presentation to the signatures to create reference signatures.

At block 518, the example reference signature database 316 stores the reference signatures in the database for future use in comparing audio signatures to reference signatures for classifying media.

An example process that may be used to implement block 512 is described below in connection with FIG. 6. With reference to the preceding figures and associated descriptions, the example machine readable instructions 600 of FIG. 6 begin execution at block 602 at which the example validator 312 determines if the media presented is from a predefined content provider. If the media is from a predefined content provider, processing transfers to block 604. Conversely, if the media is not from a predefined content provider, processing transfers to block 612.

At block 604, the example validator 312 determines if the media is presented from a browser 202 that is on a predefined list of browsers. If the browser 202 is on a predefined list of browsers, processing transfers to block 612. Conversely, if the browser 202 is not on a predefined list of browsers, processing transfers to block 612.

At block 606, the example validator 312 determines if the metadata indicates that a seek function occurred (e.g., the user changed the playback position of the media to an alternate position). If a seek function occurred at any time throughout the media presentation, processing transfers to block 608. Conversely, if a seek function did not occur at any time throughout the media presentation, processing transfers to block 610.

At block 608, the example validator 312 determines if the number of times a seek function was used is less than or equal to a set threshold for a maximum number of seek functions in a media presentation. If the number of seek functions used is less than or equal to the seek threshold, processing transfers to block 610. Conversely, if the number of seek functions used is more than or equal to the seek threshold, processing transfers to block 612.

At block 610, the example validator 312 determines if the played duration of the media is less than or equal to the total media duration, and if the difference between the total media duration minus the play duration is less than a predefined value. The played duration is calculated by the validator 312 by determining the amount of time the media was actually played based upon the start timestamp of the presentation, the stop timestamp of the presentation, and various event timestamps in between. If the play duration is less than or equal to the total media duration and the difference of the total media duration minus the play duration is less than a predefined value, processing transfers to block 614. Conversely, if the play duration is not less than the total media duration and/or the difference of the total media duration minus the play duration not less than a predefined value, processing transfers to block 612.

At block 612, the example validator 312 assigns the presentation of media as not having passed the validation threshold. The example central facility 124 may discard this data, or store it to a data store for auditing purposes.

At block 614, the example validator 312 assigns the presentation of media as having passed the validation threshold.

Figure 7:
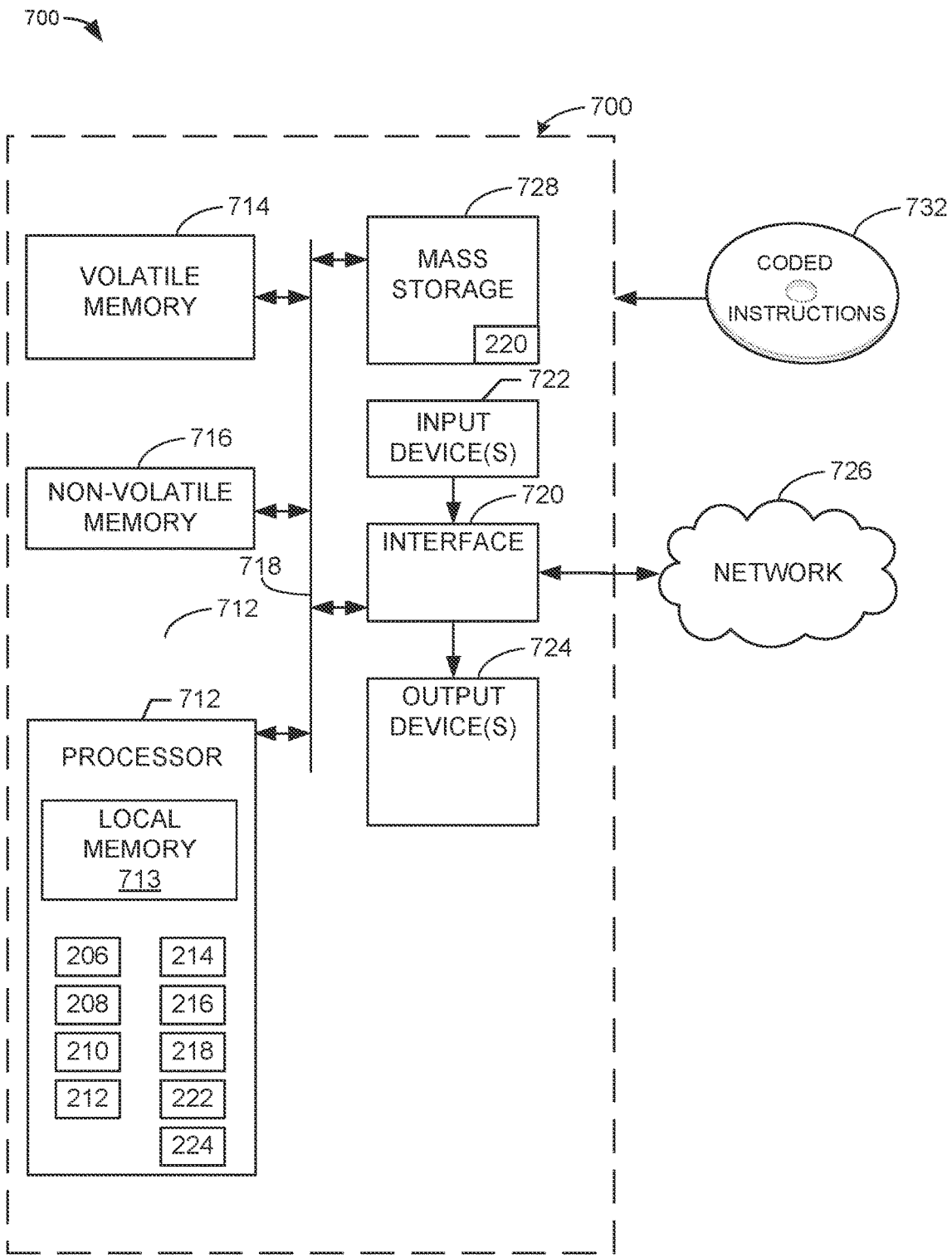
FIGS. 7, 8 and 9 are schematic illustrations of example processor platforms that may execute the instructions of FIGS. 4, 5, and 6 to implement the example media monitoring device of FIGS. 1, 2A, 2B and/or the central processing facility of FIGS. 1 and 3.

FIG. 7 is a block diagram of an example processor platform 700 capable of executing the instructions of FIG. 2A to implement the apparatus of FIG. 2A. The processor platform 700 can be, for example, a server, a personal computer, a mobile device (e.g., a cell phone, a smart phone, a tablet such as an iPad®), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. The hardware processor may be a semiconductor based (e.g., silicon based) device. In this example, the processor implements the example media metadata extractor 206, the example event metadata extractor 208, the example audio receiver 210, the example timestamper 212, the example media monitor identifier 214, the example audio signature generator 216, the example log file generator 218, the example log file reporter 222, and the example timer 224.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a peripheral component interconnect (PCI) express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIG. 4 may be stored in the mass storage device 728, in the volatile memory 714, in the non-volatile memory 716, and/or on a removable tangible computer readable storage medium such as a CD or DVD.

Figure 8:
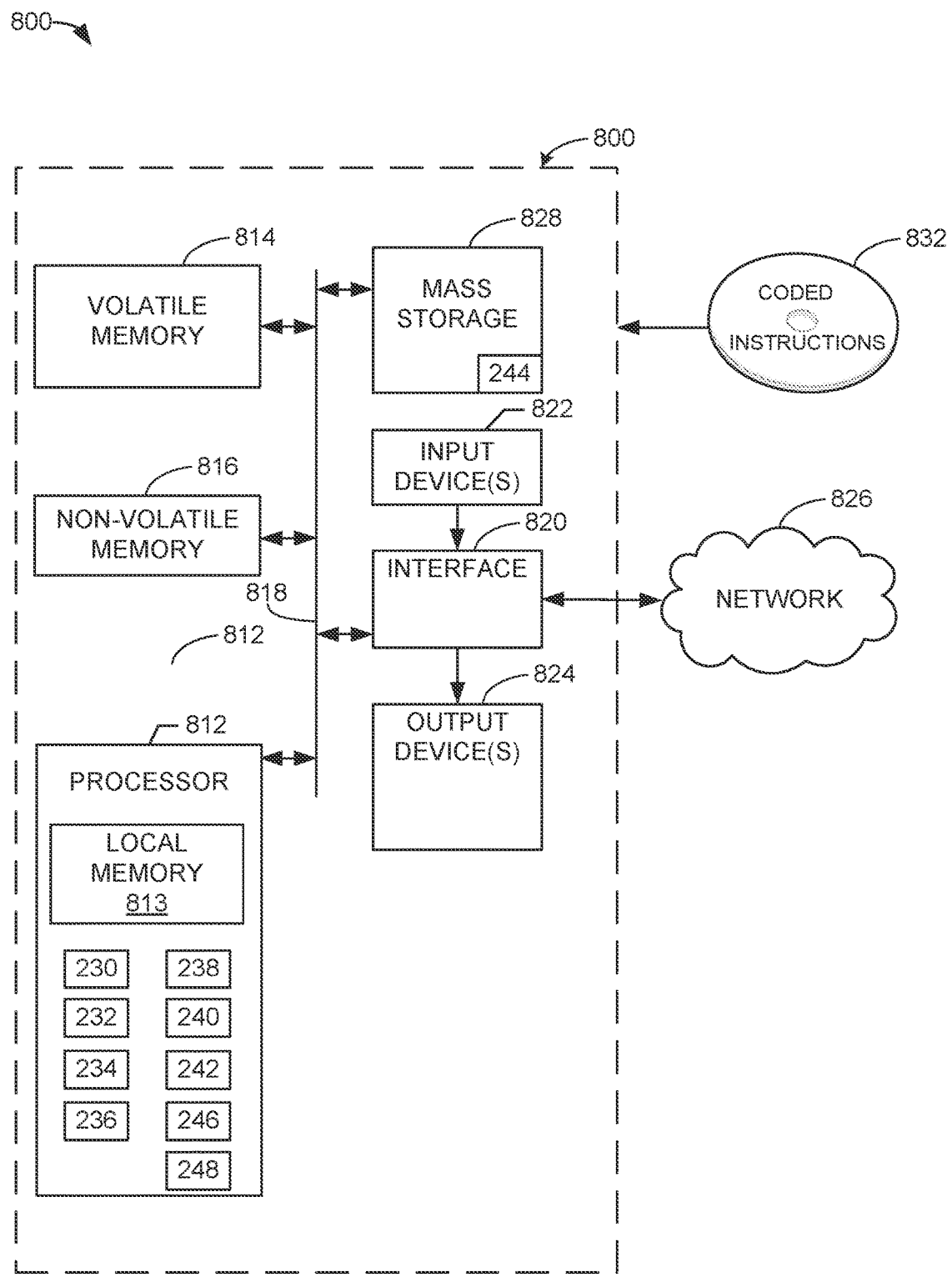

FIG. 8 is a block diagram of an example processor platform 800 capable of executing the instructions of FIG. 2B to implement the apparatus of FIG. 2B. The processor platform 800 can be, for example, a server, a personal computer, a mobile device (e.g., a cell phone, a smart phone, a tablet such as an iPad®), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The hardware processor may be a semiconductor based (e.g., silicon based) device. In this example, the processor implements the example media metadata extractor 230, the example event metadata extractor 232, the example audio receiver 234, the example timestamper 236, the example media monitor identifier 238, the example audio signature generator 240, the example log file generator 242, the example log file reporter 246, and the example timer 248.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIG. 4 may be stored in the mass storage device 828, in the volatile memory 814, in the non-volatile memory 816, and/or on a removable tangible computer readable storage medium such as a CD or DVD.

Figure 9:
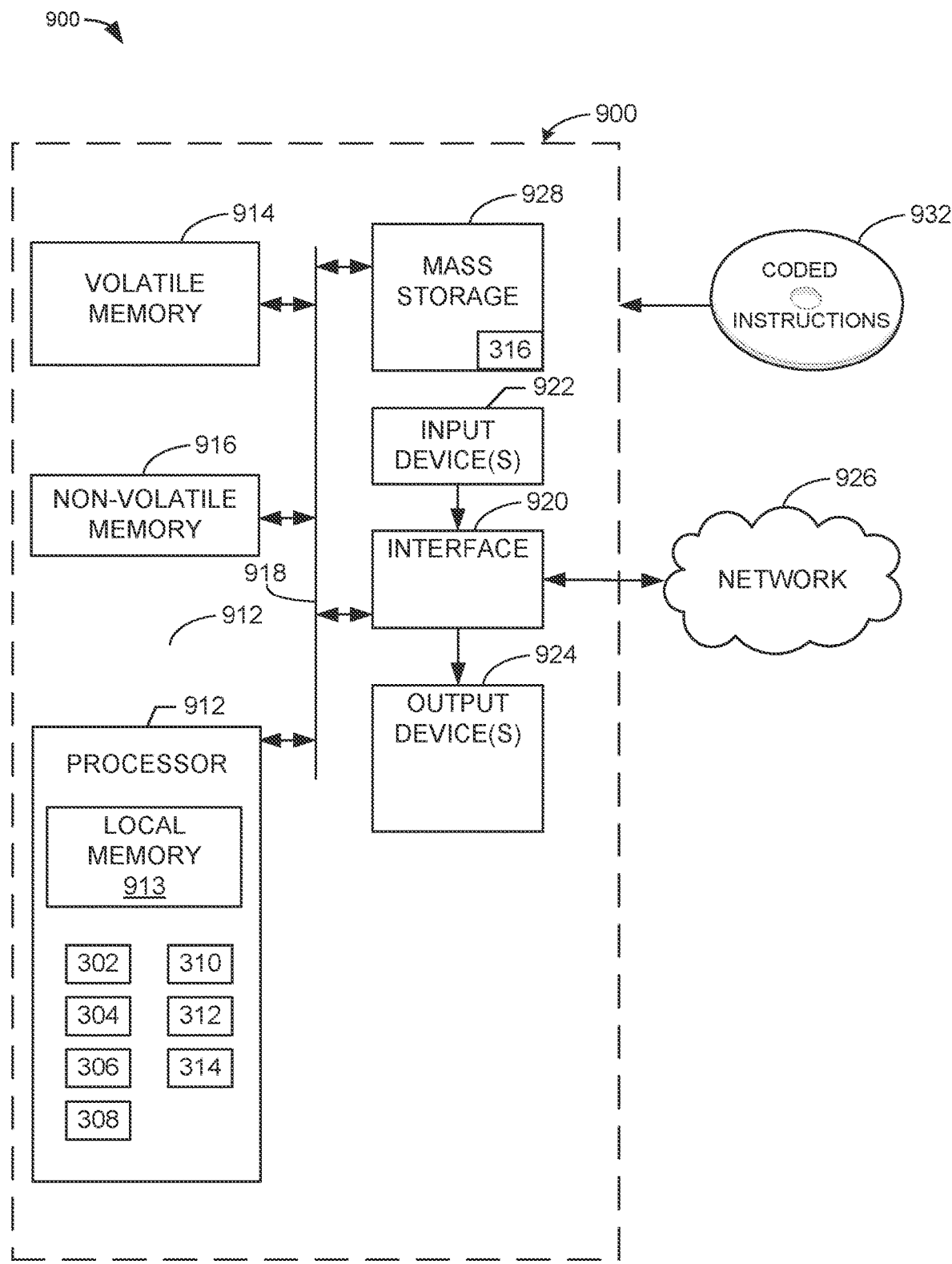

FIG. 9 is a block diagram of an example processor platform 900 capable of executing the instructions of FIG. 3 to implement the apparatus of FIG. 3. The processor platform 900 can be, for example, a server, a personal computer, a mobile device (e.g., a cell phone, a smart phone, a tablet such as an iPad®), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor may be a semiconductor based (e.g., silicon based) device. In this example, the processor implements the example network interface 302, the example log file receiver 304, the example audio and metadata associator 306, the example meter ID comparator 308, the example timestamp comparator 310, the example validator 312, the example reference signature generator 314, the example reference signature database 316

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIG. 9 may be stored in the mass storage device 928, in the volatile memory 914, in the non-volatile memory 916, and/or on a removable tangible computer readable storage medium such as a CD or DVD.

From the foregoing, it will be appreciated that example methods, apparatus and articles of manufacture have been disclosed that enable the generation of reference signatures from metadata and audio signatures collected at the panelist household will allow for simplification of reference signature generation through crowdsourcing. The disclosed methods, apparatus and articles of manufacture eliminate the requirement for audience measurement entities to generate reference signatures at controlled reference sites, or receive reference material from content providers. Additionally, the disclosed methods, apparatus and articles of manufacture disclose methodology for processing, validating and matching metadata and audio signatures continuously to allow for constant reference signature generation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
at least one memory;
instructions in the apparatus; and
processor circuitry to execute the instructions to:
in response to receiving a log file, compare a first media monitor identification associated with an audio signature, a second media monitor identification associated with media metadata, and a third media monitor identification associated with event metadata in the log file;
determine if a first timestamp associated with the audio signature is within a time period, wherein the time period begins with a second timestamp associated with the media metadata and ends with a third timestamp associated with the event metadata, wherein the audio signature, the media metadata, and the event metadata have the same media monitor identification;
validate that the audio signature satisfies a threshold for being stored as a reference signature based on at least one of the media metadata, the event metadata, the first timestamp, the second timestamp, or the third timestamp, wherein the first timestamp is within the time period; and
in response to validating the audio signature, generate the reference signature including assigning the media metadata to the audio signature.

2. The apparatus of claim 1, wherein the media metadata includes at least one of a title, an episode name, a season name, a media source, a media provider, a media length, a play duration, an audio language, a trailer title, a subtitle, a uniform resource locator, date and time, or a current time.

3. The apparatus of claim 1, wherein the event metadata includes playback events that occur during the audio signature, the playback events including at least one of a start event, a stop event, a pause event, a seek event, an unload event, an empty event, or an abort event.

4. The apparatus of claim 1, wherein the processor circuitry is to:
determine if the audio signature is generated from media presented from a browser that is on a predefined list;
determine if the event metadata indicates that a number of seek events performed during the audio signature satisfies a seek threshold; and
validate that the audio signature satisfies the threshold based on at least one of the browser being on the predefined list or the number of seek events performed satisfying the seek threshold.

5. The apparatus of claim 1, wherein the processor circuitry is to:
determine that the first timestamp indicates a start event of a presentation that includes the audio signature; and
determine that the third timestamp indicates a stop event of the presentation that includes the audio signature.

6. The apparatus of claim 5, wherein the processor circuitry is to:
calculate a total media duration of the presentation based on the first timestamp, the third timestamp, and the event metadata of the audio signature;
determine that a play duration of the presentation satisfies a predefined value; and
validate that the audio signature satisfies a threshold based on the total media duration satisfying the predefined value.

7. At least one non-transitory computer readable medium comprising instructions that, when executed, cause processor circuitry to at least:
in response to receiving a log file, compare a first media monitor identification associated with an audio signature, a second media monitor identification associated with media metadata, and a third media monitor identification associated with event metadata in the log file;
determine if a first timestamp associated with the audio signature is within a time period, wherein the time period begins with a second timestamp associated with the media metadata and ends with a third timestamp associated with the event metadata, wherein the audio signature, the media metadata, and the event metadata have the same media monitor identification;
validate that the audio signature satisfies a threshold for being stored as a reference signature based on at least one of the media metadata, the event metadata, the first timestamp, the second timestamp, or the third timestamp, wherein the first timestamp is within the time period; and in response to validating the audio signature, generate the reference signature including assigning the media metadata to the audio signature.

8. The at least one non-transitory computer readable medium of claim 7, wherein the media metadata includes at least one of a title, an episode name, a season name, a media source, a media provider, a media length, a play duration, an audio language, a trailer title, a subtitle, a uniform resource locator, date and time, or a current time.

9. The at least one non-transitory computer readable medium of claim 7, wherein the event metadata includes playback events that occur during the audio signature, the playback events including at least one of a start event, a stop event, a pause event, a seek event, an unload event, an empty event, or an abort event.

10. The at least one non-transitory computer readable medium of claim 7, wherein the instructions further cause the processor circuitry to:

determine if the audio signature is generated from media presented from a browser that is on a predefined list;

determine if the event metadata indicates that a number of seek events performed during the audio signature satisfies a seek threshold; and validate that the audio signature satisfies the threshold based on at least one of the browser being on the predefined list or the number of seek events performed satisfying the seek threshold.

11. The at least one non-transitory computer readable medium of claim 7, wherein the instructions further cause the processor circuitry to:

determine that the first timestamp indicates a start event of a presentation that includes the audio signature; and determine that the third timestamp indicates a stop event of the presentation that includes the audio signature.

12. The at least one non-transitory computer readable medium of claim 11, wherein the instructions further cause the processor circuitry to:

calculate a total media duration of the presentation based on the first timestamp, the third timestamp, and the event metadata of the audio signature;

determine that a play duration of the presentation satisfies a predefined value; and validate that the audio signature satisfies a threshold based on the total media duration satisfying the predefined value.

13. A method comprising:

in response to receiving a log file, comparing a first media monitor identification associated with an audio signature, a second media monitor identification associated with media metadata, and a third media monitor identification associated with event metadata in the log file;

determining if a first timestamp associated with the audio signature is within a time period, wherein the time period begins with a second timestamp associated with the media metadata and ends with a third timestamp associated with the event metadata, wherein the audio signature, the media metadata, and the event metadata have the same media monitor identification;

validating that the audio signature satisfies a threshold for being stored as a reference signature based on at least one of the media metadata, the event metadata, the first timestamp, the second timestamp, or the third timestamp, wherein the first timestamp is within the time period; and in response to validating the audio signature, generating the reference signature including assigning the media metadata to the audio signature.

14. The method of claim 13, wherein the media metadata includes at least one of a title, an episode name, a season name, a media source, a media provider, a media length, a play duration, an audio language, a trailer title, a subtitle, a uniform resource locator, date and time, or a current time.

15. The method of claim 13, wherein the event metadata includes playback events that occur during the audio signature, the playback events including at least one of a start event, a stop event, a pause event, a seek event, an unload event, an empty event, or an abort event.

16. The method of claim 13, further including:

determining if the audio signature is generated from media presented from a browser that is on a predefined list;

determining if the event metadata indicates that a number of seek events performed during the audio signature satisfies a seek threshold; and validating that the audio signature satisfies the threshold based on at least one of the browser being on the predefined list or the number of seek events performed satisfying the seek threshold.

17. The method of claim 13, further including:

determining that the first timestamp indicates a start event of a presentation that includes the audio signature; and determining that the third timestamp indicates a stop event of the presentation that includes the audio signature.

18. The method of claim 17, further including:

calculating a total media duration of the presentation based on the first timestamp, the third timestamp, and the event metadata of the audio signature;

determining that a play duration of the presentation satisfies a predefined value; and validating that the audio signature satisfies a threshold based on the total media duration satisfying the predefined value.

* * * * *